United States Patent [19]

Senshu et al.

[11] Patent Number: 5,237,554
[45] Date of Patent: Aug. 17, 1993

[54] APPARATUS FOR GENERATING CLOCK SIGNALS FOR DATA REPRODUCTION

[75] Inventors: Susumu Senshu; Tetsuji Kawashima, both of Kanagawa, Japan

[73] Assignee: Sony Corporation, Tokyo, Japan

[21] Appl. No.: 630,330

[22] Filed: Dec. 19, 1990

[30] Foreign Application Priority Data

Dec. 27, 1989 [JP] Japan .................................. 1-336529
May 29, 1990 [JP] Japan ............................. 2-056331[U]
Jul. 12, 1990 [JP] Japan ................................. 2-184594

[51] Int. Cl.⁵ ............................................. H04N 5/76
[52] U.S. Cl. ..................................... 369/59; 369/47; 369/48; 360/51
[58] Field of Search ...................... 369/47, 48, 59, 49; 375/106, 118, 119, 120; 360/51

[56] References Cited

U.S. PATENT DOCUMENTS

| Re. 32,945 | 6/1989 | Smithson ............................. 375/106 |
| 4,873,703 | 10/1989 | Crandall et al. ..................... 375/106 |
| 4,949,325 | 8/1990 | Tsuyoshi et al. ..................... 369/49 |
| 5,099,477 | 3/1992 | Taniguchi et al. ................... 375/118 |

FOREIGN PATENT DOCUMENTS

| 0219037 | 4/1987 | European Pat. Off. ............. 328/151 |
| 0320975 | 6/1989 | European Pat. Off. ............. 328/139 |
| 3435764 | 5/1985 | Fed. Rep. of Germany ........ 369/49 |
| 3622239 | 1/1987 | Fed. Rep. of Germany ........ 369/59 |
| 3809223 | 10/1988 | Fed. Rep. of Germany ........ 369/32 |

Primary Examiner—Aristotelis Psitos
Assistant Examiner—Duncan Wilkinson
Attorney, Agent, or Firm—Alvin Sinderbrand; William S. Frommer

[57] ABSTRACT

An apparatus for phase correction of clock signal used for data reproduction employs reference clock signals recorded with the data to select the optimum phase increment for outside clock signals generated from preformed patterns on the recording medium. An apparatus for data reproduction compares recorded data sampled using outside clock signals phase corrected by the optimum phase increment with a threshold based on the reference clock signals to reproduce the recorded data with a high noise margin.

17 Claims, 18 Drawing Sheets

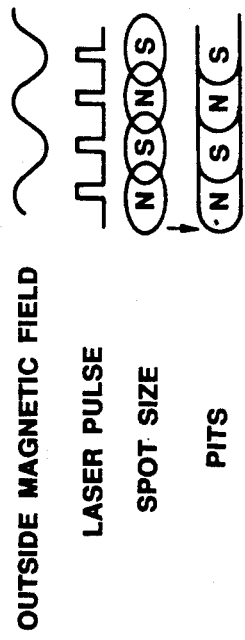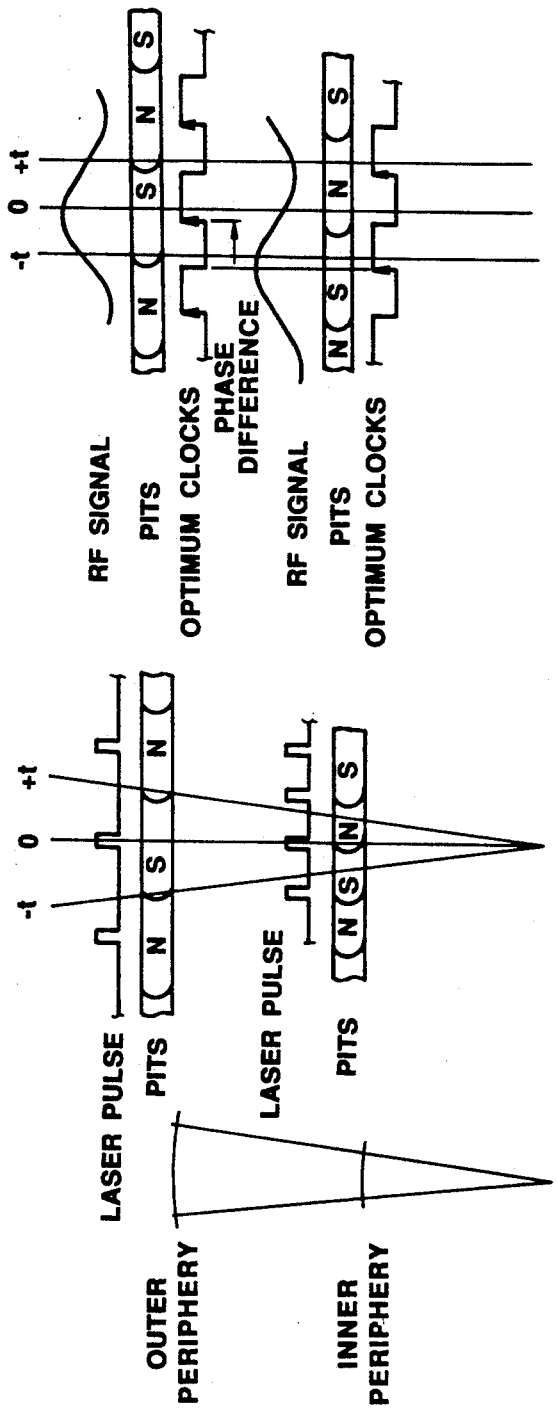

APPARATUS FOR GENERATING CLOCK SIGNALS FOR DATA REPRODUCTION

BACKGROUND OF THE INVENTION

1. Field of the Invention

This invention relates to an apparatus for generating data-reproducing clock signals, and a data reproducing apparatus. More particularly, it relates to an apparatus for generating data-reproducing clock signals in which outside clock signals are phase-corrected by using reference clock signals recorded on the recording medium, and a data reproducing apparatus in which data are reproduced by using such phase-corrected outside clock signals.

2. Prior Art

In a magnetic field modulation magneto-optical recording system, those portions on a disc which have reached the Curie temperature by laser irradiation are magnetized in accordance with an orientation of an externally applied magnetic field to record data. That is, a laser diode, for example, is driven by pulses to emit light, an external magnetic field is modulated by data to be recorded and pits are thereby formed sequentially on the recording surface. The sizes are determined by the spot size of the laser beam and correspond to the portions of the disc magnetized by the outside magnetic field. If, for raising the recording density, the duration of the pulses which drive the laser light source is selected to be smaller than the spot size of the laser beam, a portion of the laser beam spot overlaps a portion of the previously formed pit so that, as shown in FIG. 1, the newly formed pit overwrites a portion of the previously formed pit. That is, the pits are formed sequentially and an overlapping is produced if the recording density is raised. The result is the so-called edge recording system in which data are carried by transition points or edges of the orientation of magnetization, such as the NRZI (non-return-to-zero-inverted) system.

In a magneto-optical recording system, such as a system with a magneto-optical disc which is rotationally driven by a spindle motor at a constant linear velocity (CLV) or at a constant angular velocity (CAV), pits are arranged as a spiral pit row or as concentric pit rows, respectively. With CAV driving, the distance or length traversed by a recording head during a unit time interval is lesser on the inner periphery than on the outer periphery, so that, as shown in FIG. 2, the amount of overlapping on the inner periphery is larger than on the outer periphery. If data are reproduced from the pits recorded in this manner, the signals reproduced from the pits on the inner periphery are temporally out of phase, that is, advanced or shifted, relative to those reproduced from the pits on the outer periphery, as shown in FIG. 3. If, with the so-called outside clocking system not employing self-clocking, the pits on the inner periphery are reproduced by using the outside clock signals, that is, the synchronizing clock signals from the magneto-optical disc for reproducing the pits on the outer periphery, the above mentioned transition points or edges cannot be located correctly. In other words, the detection window becomes narrower and, if the so-called NRZI modulation system is used for modulating the magnetic field, the noise margin relative to the threshold value for checking if there is or there is not an edge during reproduction is reduced.

For overcoming these deficiencies, corrections may be made during recording on the basis of radius data of the recording disc or ambient recording conditions, such as the temperature of power of the laser light source, before proceeding to the pit forming operation. However, it is difficult to set forth the detailed recording conditions for appropriate corrections. Additionally, since the disc properties differ from one disc to another, and the properties of the data recording apparatus also differ from those of the data reproducing apparatus, it is not sufficient to make corrections at the time of recording. Thus, to achieve a high recording density, it is necessary to correct the signals reproduced from the magneto-optical disc so that they are temporally in phase with each other on the basis of the signals themselves at the time of data reproduction.

While there is known a so-called self-clocking system in which clock signals superimposed on data signals recorded on a magneto-optical disc are extracted during reproduction and used as reproducing clock signals, it is necessary with this system to use a dedicated modulation system and to provide a sufficient clock capturing region to enable correct clock extraction.

OBJECTS AND SUMMARY OF THE INVENTION

It is therefore a primary object of the present invention to provide an apparatus for generating clock signals for data reproduction in which outside clock signals may be produced which will prevent data errors from occurring as a result of phase deviations of the reproduced waveform at the inner and outer disc peripheries at the time of reproduction of, for example, a magneto-optical disc, particularly, a high recording density magneto-optical disc, driven at a constant angular velocity (CAV).

It is another object of the present invention to provide an apparatus for generating clock signals for data reproduction in which the modulation system may be selected freely and which is not affected by differences in the properties of the recording medium, ambient recording conditions or the properties of the data recording apparatus and the data reproducing apparatus.

It is a further object of the present invention to provide a data reproducing apparatus in which the outside clock signals from the above mentioned apparatus for generating clock signals for data reproduction are used for reproducing the data.

It is a further object of the present invention to provide a data reproducing apparatus which is not affected by the differences in the properties of the recording medium, or in the properties of the data recording apparatus and the data reproducing apparatus or ambient recording conditions.

According to the present invention, there is provided an apparatus for reproducing data from a recording medium having thereon reference clock signals or signals of repetitive patterns of a predetermined period, comprising: outside clock signal forming means for forming a plurality of outside clock signals having respective different phases; sampling means for sampling said reference clock signals by using the outside clock signals formed by said outside clock signal forming means so as to provide respective sampling values; maximum value detection means for detecting a maximum value of differences between the sampling values associated with said outside clock signals, respectively; and outside clock signal selecting means for selecting and outputting the one of said outside clock signals from said outside clock signal forming means associated with the maximum value detected by said maximum value detection means.

According to the present invention, there is also provided an apparatus for reproducing recorded data recorded at a maximum recording frequency from a recording medium also having thereon reference clock signals or signals of repetitive patterns of a frequency equal to the maximum recording frequency, comprising: outside clock signal forming means for forming a plurality of outside clock signals having respective different phases; sampling means for sampling the reference clock signals reproduced from said recording medium by using the outside clock signals formed by said outside clock signal forming means so as to provide respective sampling values and for sampling said recorded data reproduced from said recording medium using one of said outside clock signals so as to provide recorded data sampling values; processing means for calculating a difference between successive sampling signals from the sampling means; maximum value detection means for detecting a maximum value of the differences between said sampling values associated with said outside clock signals respectively; outside clock signal selecting means for selecting and outputting the one of said outside clock signals from said outside clock signal forming means associated with said maximum value detected by said maximum value detection means; and data reproducing means for comparing a difference calculated by said processing means based on said recorded data sampling values sampled by said sampling means using the outside clock signal selected by said outside clock signal selecting means and a value about equal to one half of the maximum value detected by said maximum value detection means, thereby reproducing the recorded data.

In the apparatus for generating clock signals for data reproduction according to the present invention, the reproduced reference clock signals recorded on the recording medium are sampled by using outside clock signals with respective different phases, and the outside clock signal having the phase which will give the maximum difference of the sampling values is selected as the outside clock signal used for data reproduction.

In the data reproducing apparatus of the present invention, the difference between sampling values obtained upon sampling the reproduced data signals by using the outside clock signal from the above mentioned apparatus for generating data-reproducing clock signals is compared to a value equal to about one-half of the maximum value of the differences between the sampling values associated with the reproduced reference clock signals, thereby reproducing the data.

BRIEF DESCRIPTION OF THE DRAWINGS

FIG. 1 is a diagrammatic view illustrating the recording principle for a magneto-optical recording medium.

FIG. 2 is a diagrammatic view showing pits formed on a magneto-optical disc for a CAV driven system.

FIG. 3 is a diagrammatic view showing the traversal time for the pits of FIG. 2 in a CAV driven system.

DETAILED DESCRIPTION OF PREFERRED EMBODIMENTS

Figure 4:
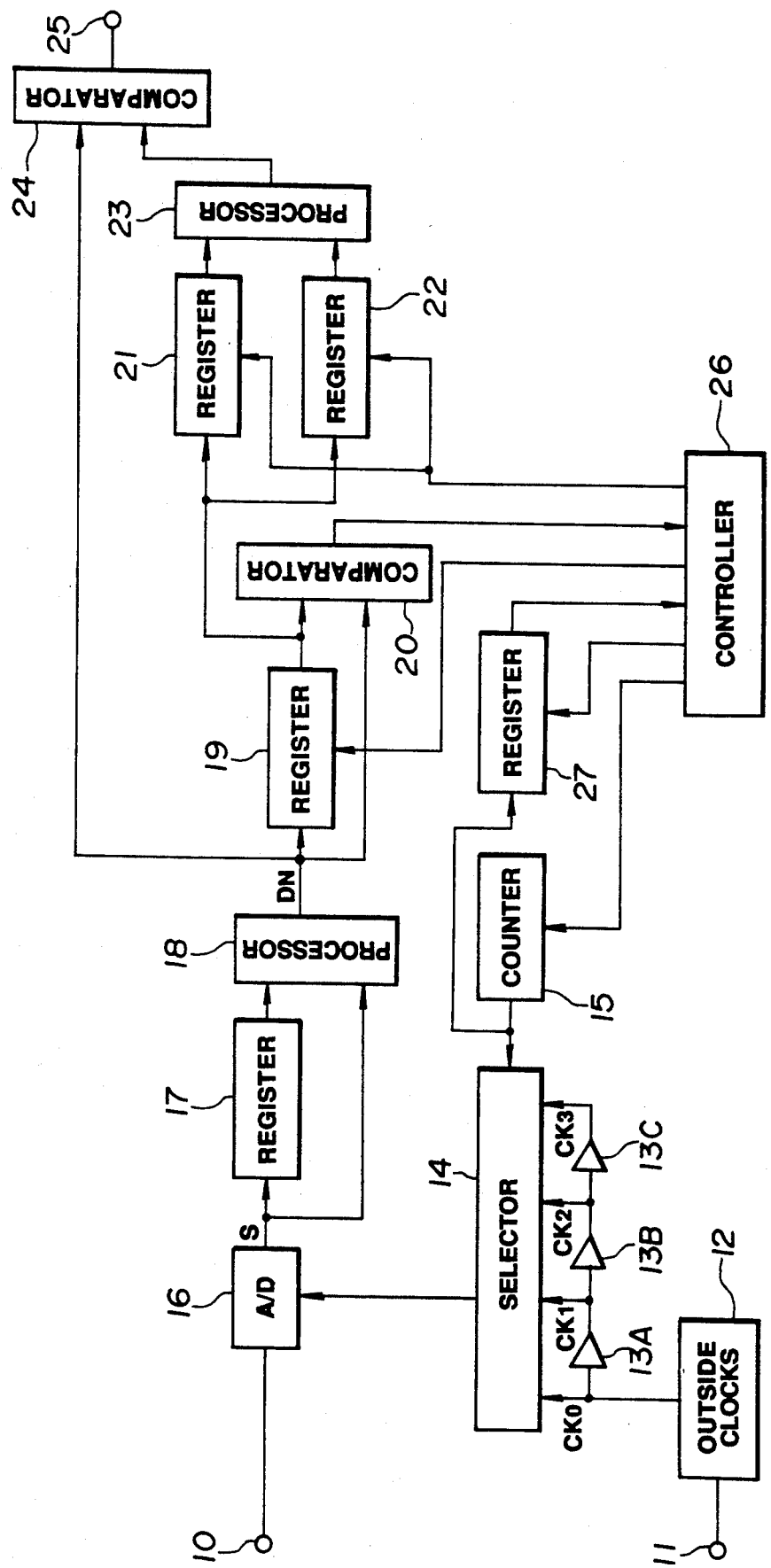
FIG. 4 is a block circuit diagram showing a data reproducing apparatus employing an apparatus for generating data-reproducing clock signals according to the present invention.

By referring to the drawings, certain preferred embodiments of the present invention will be explained in detail.

Figure 5:
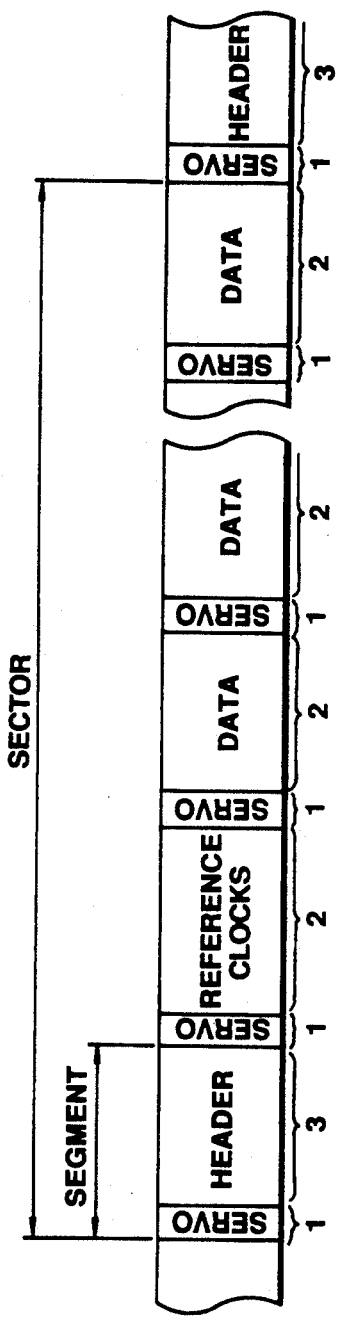
FIG. 5 is a diagrammatic view showing a recording format for a magneto-optical disc employed in a reproducing apparatus according to the present invention.

FIG. 4 is block circuit diagram of an apparatus for generating data-reproducing clock signals according to the present invention, and FIG. 5 shows an example of a recording format for a magneto-optical disc employed in a data recording/reproducing apparatus.

The recording format for the magneto-optical disc is hereinafter explained.

Referring to FIG. 5, a sector as a data recording unit is made up of a predetermined number of segments or frames. Each segment consists of a servo region 1 and a data region 2. In the leading segment of each sector, a header region 3, in which addresses or like data are recorded, is formed in the data region 2. In each servo region, a pair of so-called wobbling pits for producing a so-called tracking error signal and clock pits for clock synchronization, are preformed by embossing. In the data region 2, data are recorded or reproduced using photomagnetic effects. To overcome the above mentioned problem caused by phase deviations of the reproduced data signals on the inner and outer peripheries of the magneto-optical disc, reference clock signals and a constant level signal are recorded in, for example, the data region 2 of the second segment at the time of data recording, as shown in FIG. 5. The reference clock signals are recorded in the first half of the data region 2 of the second segment so that their frequency will be equal to the maximum frequency of the reproduced data signals. The reference clock signals alternatively are signals of repetitive patterns of a predetermined period. In the remaining portion of the data region 2 of the second segment, there is recorded a signal which, when reproduced is at a constant amplitude level.

For reproducing a recording medium having the above mentioned recording format, such as a magneto-optical disc, synchronization clock signals, referred to herein as outside or external clock signals are used as clock signals for data reproduction. According to the present invention, the reference clock signals are used for phase correction of the outside clock signals, as will be explained subsequently.

An apparatus for generating clock signals for data reproduction according to the present invention, is hereinafter explained.

Referring to FIG. 4, the RF (high frequency) signals reproduced from a magneto-optical disc rotationally driven at a constant angular velocity (CAV) by a spindle motor, are supplied to a terminal 10 as reproduced signals by means of an amplifier, an equalizer and so forth. Signals obtained by reproducing the clock pits in the servo region 1 of the magneto-optical disc are supplied to a terminal 11.

An outside clock reproducing circuit 12, for example, a phase-locked loop, supplies an outside clock signal $CK_0$ from signals reproduced from the clock pits. The outside clock signal $CK_0$ is delayed at, for example, three series-connected delay circuits 13A, 13B and 13C, generating outside clock signals $CK_1$, $CK_2$ and $CK_3$, respectively. The outside clock signals $CK_0$ to $CK_3$ are of different phases. In this manner, outside clock signal forming means for forming plural outside clock signals $CK_0$, $CK_1$, $CK_2$ and $CK_3$ have respective different phases are constituted by the outside clock reproducing circuit 12 and the delay circuits 13A, 13B and 13C.

Figure 6:
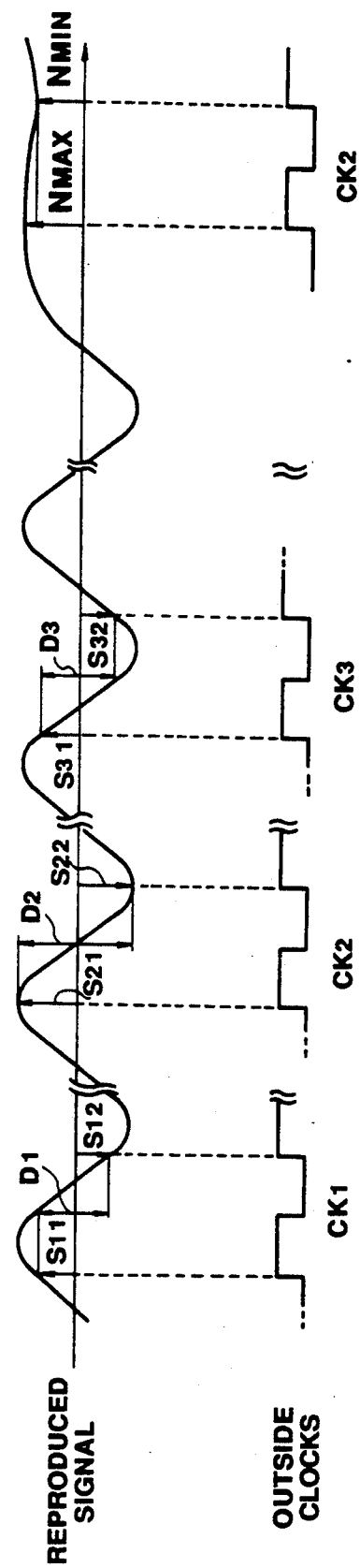
FIG. 6 is a chart showing the relation between the reference clock signals, a constant level signal and outside clock signals in the data format shown in FIG. 5.

A selector 14 responds to a control signal from a counter 15 by sequentially selecting the outside clock signals $CK_0$ to $C_3$ and transmits the selected outside clock signal to an A/D converter 16. Using the outside clock signals $CK_0$ to $CK_3$ from the selector 14 sampling signals, the A/D converter 16 samples the reproduced reference clock signals, as shown in FIG. 6, to convert the sampling values into digital sampling values S. These sampling values S are supplied to a register 17 and a processing circuit 18. Thus, in the present embodiment, the A/D converter 16 comprises sampling means for sampling the reproduced signals of the reference clock signals by using the outside clock signals $CK_0$ to $CK_3$.

The register 17 delays each sampling value S by one sampling period and supplies the delayed sampling value S to the processing circuit 18. The processing circuit 18 calculates the absolute value $D_N$ of the difference between a pair of sampling values $S_{N1}$ and $S_{N2}$ associated with each of the outside clock signals $CK_0$ to $CK_3$, where N indicates the Nth of the outside clock signals. For example, as shown in FIG. 6, the absolute values $D_N$ of the differences of the sampled values $S_{N1}$ and $S_{N2}$ associated with the outside clock signals $CK_0$ to $CK_3$, may be found from the formula:

$$D_N = |S_{N1} - S_{N2}|$$

where N indicates the Nth of the outside clock signals. The absolute values $D_N$ of the differences of the sampling values associated with the outside clock signals $CK_0$ to $CK_3$ are supplied to a register 19 and a comparator 20. The register 19 delays an absolute value $D_N$ of the difference of the sampling values by, for example, one sampling period, and transmits the absolute value $D_N$ of the difference of the delayed sampling values to the comparator 20. The comparator 20 compares the absolute value $D_N$ of the difference of the delayed sampling values with the absolute value $D_N$ of the difference of the current sampling values from the processing circuit 18 and supplies the result of comparison to a controller 26. When the absolute value $D_2$ of the difference between the current sampled values is larger than the absolute value $D_1$ of the difference between the delayed sampling values as shown in FIG. 6, the controller 26 causes the register 21 to store the absolute value $D_2$ of the difference of the current sampling values in register 19. That is, the maximum one of the absolute values $D_N$ of the difference between the sampling values of the reproduced signals of the reference clock signals, recorded on the magneto-optical disc and sampled using the outside clock signals $CK_0$ to $CK_3$, is stored in register 21.

A register 27 receives and stores the control signal from the counter 15 for controlling the selector 14 whenever the register 19 is updated to a larger value. That is, the control signal, corresponding to the Nth outside clock signal for which the absolute vale $D_N$ of the difference between the sampling values of the reproduced signals of the reference clock signals is maximum, is stored in the register 27.

The controller 26 received the control signal stored in register 27 and causes the counter 15 to thereafter select and output the above mentioned outside clock signal at the selector 14 as the outside clock signal for data reproduction, as will be explained later. In the specific example shown in FIG. 6, the outside clock signal $CK_2$ is outputted, since it is determined to be the outside clock signal associated with the maximum difference in sampled reference clock values. Thus, in the present embodiment, maximum value detection means for detecting a maximum value ($S_{MAX} - S_{MIN}$) of the differences of the reference clock sampling values associated with the outside clock signals $CK_0$ to $CK_3$ comprises the registers 17 and 19, the processing circuit 18, the comparator 20 and the controller 26, while outside clock signal selecting means for selecting and outputting the outside clock signal from the outside clock signal forming means, which is associated with the maximum value ($S_{MAX} - S_{MIN}$) detected by the maximum value detection means, comprises the selector 14, the counter 15, the controller 26 and the register 27.

In this manner, by phase correcting that is, adjusting the phase of the outside clock signals on the basis of the reproduced reference clock signals actually recorded on the magneto-optical disc, it becomes possible with the apparatus for generating data-reproducing clock signals of the present invention to produce data-reproducing clock signals whereby data reproduction may be performed without being adversely influenced by the difference in the pit density between the outer and inner peripheries of the magneto-optical disc, the ambient conditions during recording, the difference in properties between the recording apparatus and the reproducing apparatus, or the difference in disc properties. Further, as explained below, even if the region in which the reference clock signals are recorded is partially defective so that part of the reproduced signal amplitude in the defective portions is reduced, the maximum difference of the reference clock sampling values may nevertheless be detected correctly by repeating the operation of detecting the maximum difference of the sampling values several times. In other words, disc defects need not be separately detected in the segment where the reference clock signals are recorded since data reproduction will not be affected by these defects.

An apparatus for reproducing data, that is, detecting whether there is an edge in a reproduced data signal, according to the present invention is hereinafter explained.

The constant level signal following the reference clock signals in the data region 2 of the second segment shown in FIG. 5 sampled by using an outside clock signal having its phase corrected with the use of the reference clock signals recorded in the first half of the data region 2 of the second segment shown in FIG. 5. That is, the constant level signal is sampled using the outside clock signal for which the difference of the reference clock sampling values has been determined to be maximum at the comparator 20 and which has accordingly been selected at the selector 14. A maximum amplitude of the noise is then found from this reproduced signal by using a procedure, described below, similar to that used when finding the maximum difference of the sampled values of the reproduced reference clock signals.

More specifically, as shown in FIG. 6, the controller 26 samples the reproduced constant level signal by using the outside clock signal $CK_2$ which was associated with the maximum difference of the sampled values of the reproduced reference clock signals, and stores the maximum value of a difference of these sampled values in a register 22, shown in FIG. 4. Thus, a maximum difference ($N_{MAX} - N_{MIN}$) of the noise, that is, of the sampling values of the constant level signal following the reference clock signals is stored in register 22 by the controller 26. The difference ($N_{MAX} - N_{MIN}$) is due to noise introduced during reproduction of the constant level signal.

A processing circuit 23 calculates, from the maximum difference ($S_{MAX} - S_{MIN}$) of the reproduced reference clock signal sampling values from register 21 and the maximum difference ($N_{MAX} - N_{MIN}$) of the constant level signal sampling values from register 22, a threshold value TH used for checking if there is or there is not an edge necessary for reproducing data recorded in accordance with, for example, the so-called NRZI modulation system, and transmits the threshold value TH to a comparator 24. More specifically, the threshold value TH used for edge detection is found from the formula $$TH = (|S_{MAX} - S_{MIN}| - |N_{MAX} - N_{MIN}|)/2$$

The comparator 24 then compares the difference between the threshold value TH and the sampling values of the reproduced data signals which are recorded in the data region of the third and the following segments of the sector transmitted from the processing circuit 18. The comparator 24 determines that there is an edge when the difference of the sampling values of the reproduced data signal is larger than the threshold value TH and that there is not an edge when the difference is less than the threshold value TH. The signal indicating if there is or there is not an edge is led out by means of a terminal 25.

Thus, in the present embodiment, outside clock signal forming means for forming plural outside clock signals $CK_0$ to $CK_3$ having respective different phases comprise the above mentioned outside clock reproducing circuit 12 and the delay circuits 13A, 13B and 13C, while the A/D converter 16 comprises sampling means for sampling the reproduced signals from the recording medium by using the outside clock signals $CK_0$ to $CK_3$ formed by the outside clock signal forming means. Processing means for calculating the difference of the sampling values of the reproduced signals from the A/D converter 16 comprises the register 17 and the processing circuit 18. Maximum value detection means for detecting the maximum value of the differences of the reference clock sampling values, associated with the outside clock signals $CK_0$ to $CK_3$, of the reproduced reference clock signals, comprises the register 19, the comparator 20 and the controller 26. Outside clock signal selecting means for selecting and outputting the outside clock signal from the outside clock signal forming means associated with the maximum value detected by the maximum value detection means comprises the selector 14, the counter 15, the controller 26 and the register 27. Data reproducing means for comparing the difference of the sampling values of the reproduced data signals from processing means employed the outside clock signal selected at the outside clock signal selecting means and a value about one half the maximum value from the maximum value detection means comprises the registers 21, 22, the processing circuit 23, the comparator 24 and the controller 26.

In the manner, by using the outside clock signals, corrected in phase on the basis of the reproduced reference clock signals actually recorded on the disc, it is possible with the present data reproducing apparatus to perform edge detection, that is, data reproduction, without being influenced by pit density differences on the outer and the inner peripheries of the magneto-optical disc, ambient recording conditions, differences in properties of the disc recording apparatus and the disc reproducing apparatus, or differences in disc properties. In addition, the maximum value of the noise, that is, the maximum value of the difference in the constant level signal sampling values, may be included in the threshold value used for edge detection for further enhancing the noise margin.

It is to be noted that the present invention is not limited to the above described embodiments. For example, the frequency of the reference clock signals recorded on the magneto-optical disc may be any other frequency than the maximum data recording frequency.

If the maximum difference ($N_{MAX} - N_{MIN}$) of the noise is not used, then the above mentioned threshold value TH employed for edge detection of the reproduced data signals in accordance with, for example, the NRZI system, may be in the form of $$TH = |S_{MAX} - S_{MIN}|/2$$

Although the phase-corrected outside clock signals are used for edge detection in the above described embodiment, it may be directly checked from the reproduced data signal if there is or there is not a mark in synchronism with the outside clock signals from the apparatus for producing data-reproducing clock signals when data is reproduced from, for example, an NRZ modulated signal without edge detection.

Figure 7:
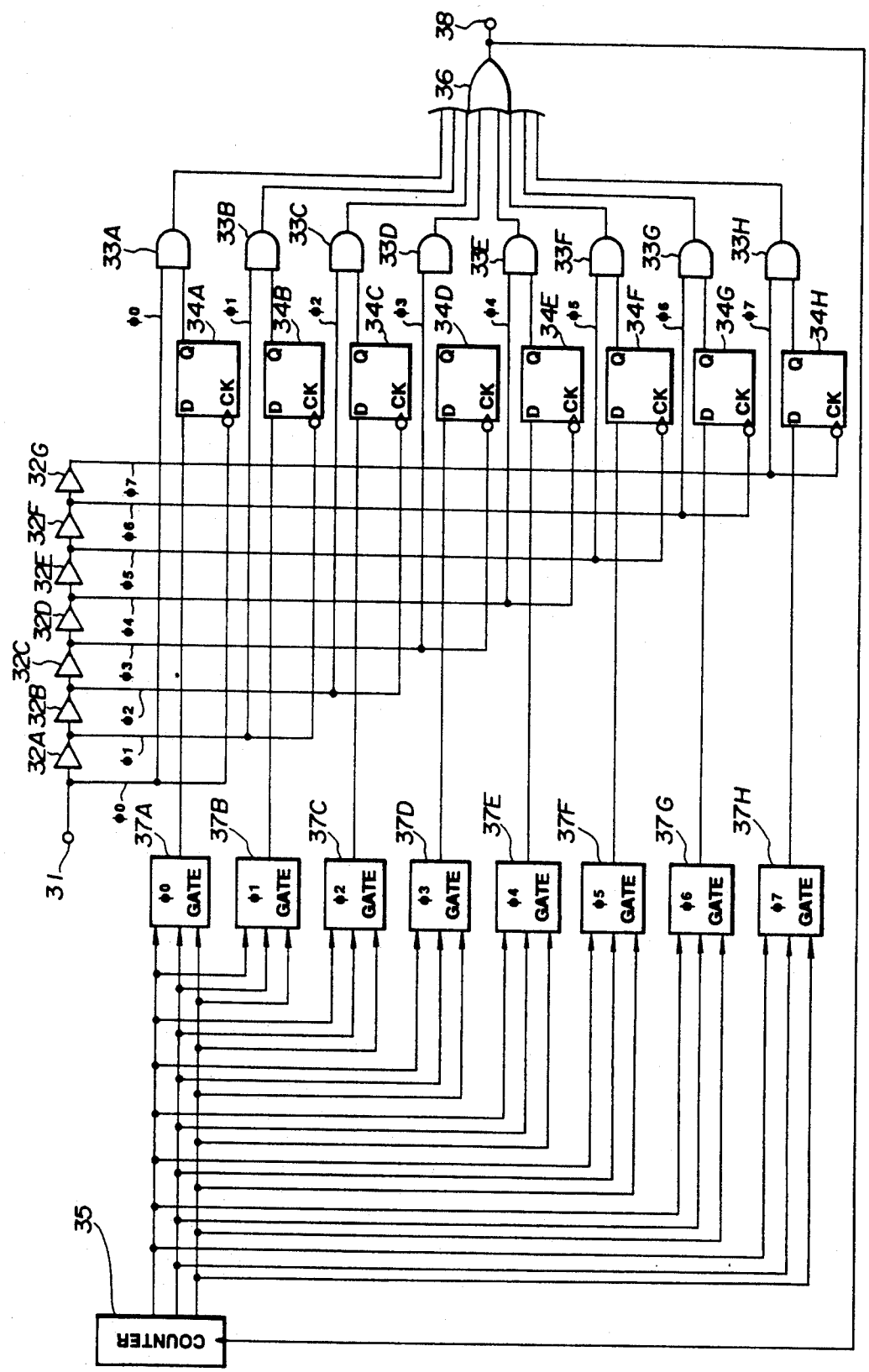
FIG. 7 is a block diagram showing a typical arrangement of a selector for outside clock signals in the data reproducing apparatus shown in FIG. 4.

In the above described data reproducing apparatus, a counter-selector arrangement shown in FIG. 7 may be employed for sequentially selecting a plurality of outside clocks having respective different phases. In FIG. 7, eight (8) clocks having respective different phases are employed.

In FIG. 7, Outside clocks formed on the basis of reproduced signals of the clock pits in the servo region 1, shown in FIG. 5, are supplied to an input terminal 31. These outside clocks are delayed by delay circuits 32A to 32G connected in series.

From the points between the delay circuits 32A to 32G, eight (8) outside clocks $\phi_0$ to $\phi_7$ having respective different phases are extracted, as shown in FIGS. 8A to 8H. These outside clocks $\phi_0$ to $\phi_7$ are supplied to one of the inputs of AND gates 33A to 33H, and also are inverted and supplied to clock inputs CK of D-flipflops 34A to 34H.

A selected one of the outside clocks is outputted from an OR gate 36 to an output terminal 38.

Figure 8:
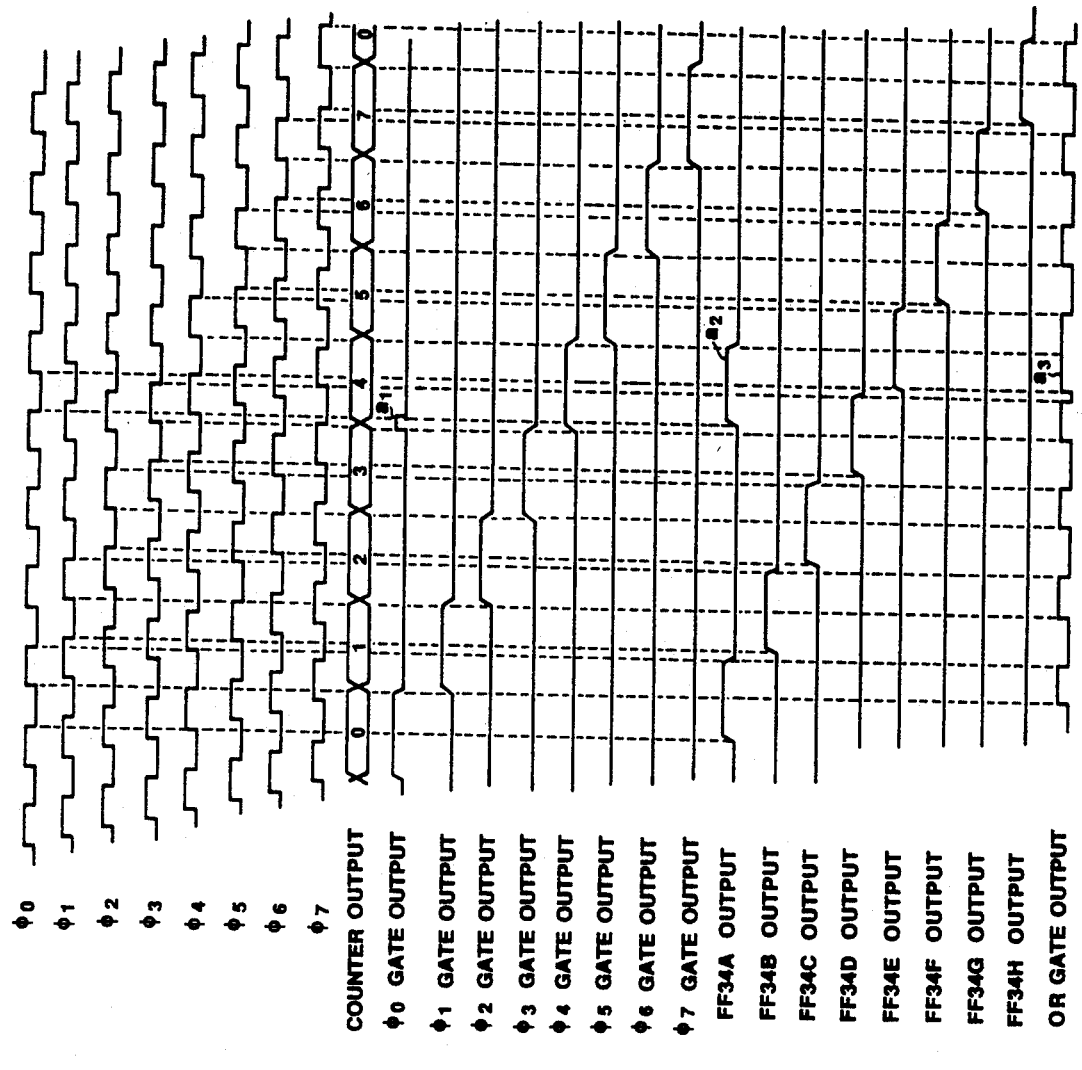
FIG. 8A–8Z are a timing chart illustrating the operation of the selector shown in FIG. 7.

A counter 35 is incremented from "000" to "111", for example, in response to the output clock at output terminal 38, as shown in FIG. 8I. The count values of the counter 35 are supplied to gate circuits 37A to 37H.

The outputs from the gate circuits 37A to 37H are "1" when the inputs thereto are "000", "001", "010", "011", "100", "101", "110" and "111", respectively.

When the counter 35 has been incremented from "000" to "111, "1" is outputted sequentially from the gate circuits 37A to 37H, respectively, as shown in FIGS. 8J to 8Q.

The outputs of the gate circuits 37A to 37H are supplied to data input terminals of the D-flipflops 34A to 34H, respectively.

At a falling edge of the eight outside clocks $\phi_0$ to $\phi_7$ having respective different phases, extracted from the points between the delay circuits 32A to 32G, the outputs of the gate circuits 37A to 37H are supplied to the D-flipflops 34A to 34H, respectively. The outputs of the D-flipflops 34A to 34H are supplied to AND gates 33A to 33H, respectively.

The outputs of the D-flipflops 34A to 34H sequentially become "1", as shown in FIGS. 8R to 8Y.

However, a malfunction may occasionally result from using the counter 35 for sequentially selecting the outside clocks having respective different phases.

For example, when the counter 35 is incremented from "011" to "100", each of the three bits of the counter output are changed. Since these three bits are not necessarily changed with the same timing, the counter 35 may have any value during transition from "011" to "100". For example, the output of counter 35 may momentarily be "000" during transition from "011" to "100".

When the output of the counter 35 is momentarily "000" during transition from "011" to "100", a hazard is produced at gate circuit 37A, as shown at $a_1$ in FIG. 8J.

If the clock $\phi_1$ (FIG. 8A) falls during the occurrence of the hazard $a_1$, D-flipflop 34A is set to "1" by the falling edge of the clock $\phi_1$, as shown at $a_2$ in FIG. 8R.

Thus a superfluous pulse is outputted from OR gate 36, as shown at $a_3$ in FIG. 8Z.

It is therefore necessary to prevent such malfunction from occurring between count values.

Figure 9:
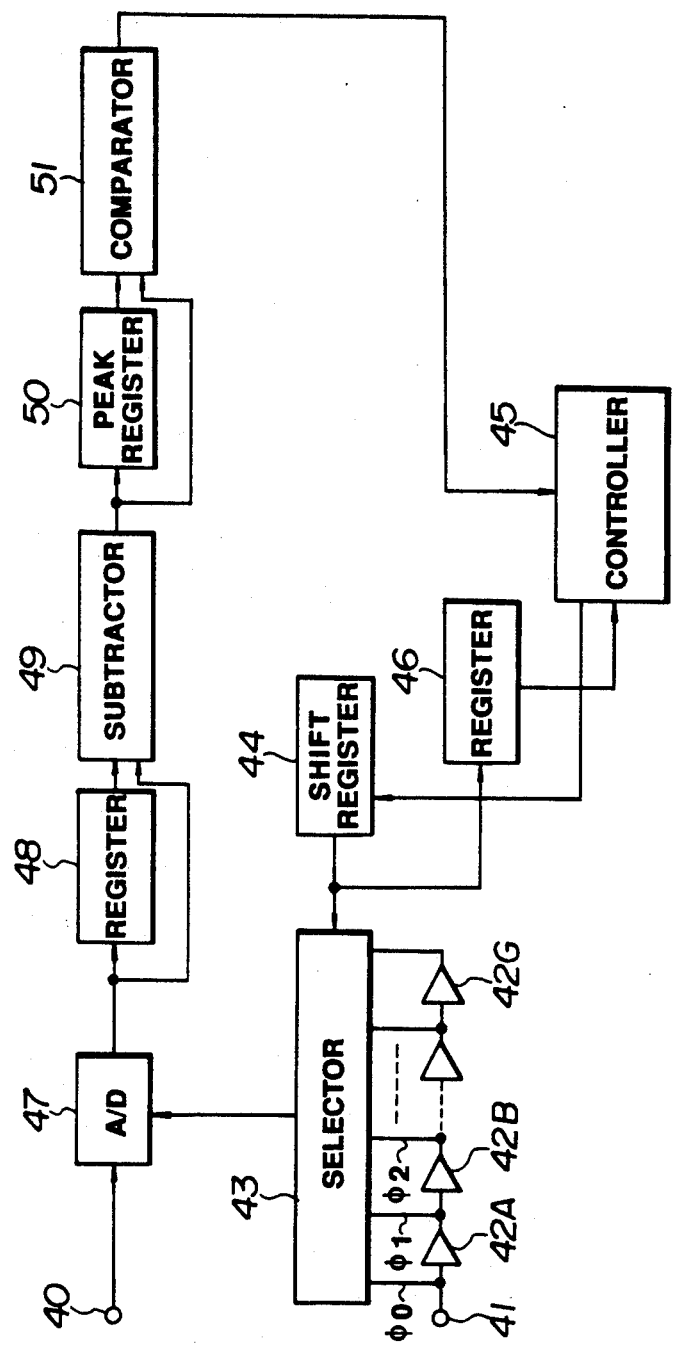
FIG. 9 is a block circuit diagram showing a modified embodiment of an apparatus for generating data-reproducing clock signals according to the present invention.

Referring to FIG. 9, which shows a modified embodiment of an apparatus for generating data-reproducing clock signals according to the present invention, outside clocks formed on the basis of the reproduced signals of the clock pits in the servo region 1 shown in FIG. 5 are supplied to an input terminal 41.

These outside clocks are delayed by plural series stage delay circuits 42A, 42B, . . . . Outside clocks $\phi_0$, $\phi_1$, $\phi_2$, . . . having respective different phases are extracted from points between the delay circuits 42A, 42B, . . . . These outside clocks $\phi_0$, $\phi_1$, $\phi_2$ . . . are supplied to a selector 43.

The selector 43 is set by the output of a shift register 44 which in turn is set by a control signal from a controller 45.

The outside clocks $\phi_0$, $\phi_1$, $\phi_2$ . . . are sequentially selected by the selector 43 in response to the output of the shift register 44. These outside clocks $\phi_0$, $\phi_1$, $\phi_2$ . . . are supplied to an A/D converter 47.

The reproduced RF signals from the disc are supplied to an input terminal 40, and thence supplied to A/D converter 47. As described previously, the reference clocks are recorded in the data region of the second segment, and the reproduced signals of these reference clocks are supplied to A/D converter 47 for phase correction of the outside clocks.

The output of the A/D converter 47 is supplied to a subtraction circuit 49 directly and after being delayed for the duration of one sample by a register 48. In the subtractor 49, the output of A/D converter 47 and the delayed output of the A/D converter 47 are subtracted one from the other, sequentially producing the difference values $D_0$, $D_1$, $D_2$, . . . of the reference clock sampling values as described previously by referring to FIG. 6.

Since the reference clocks are recorded at, for example, the maximum data recording frequency, if the reference clocks are sampled by using the outside clocks $\phi_0$, $\phi_1$, $\phi_2$, $\phi_3$, . . . , the difference of the sampling values becomes maximum when the phase relation between the reference clock and the outside clock is optimum.

The maximum value of the differences $D_0$, $D_1$, $D_2$, . . . of the values sampled by using the outside clocks $\phi_0$, $\phi_1$, $\phi_2$, $\phi_3$, . . . is stored in a peak register 50.

The output of shift register 44 is stored in a register 46. If the value in peak register 50 is updated, the value in register 46 is updated correspondingly.

In this manner, the outside clock having the optimum phase is selected from the outside clocks $\phi_1$, $\phi_2$, $\phi_3$, . . . having different phases. Data are then reproduced by using the outside clock having the optimum phase.

Sequentially selecting and outputting the outside clocks $\phi_1$, $\phi_2$, $\phi_3$, . . . is hereinafter explained in detail.

Figure 10:
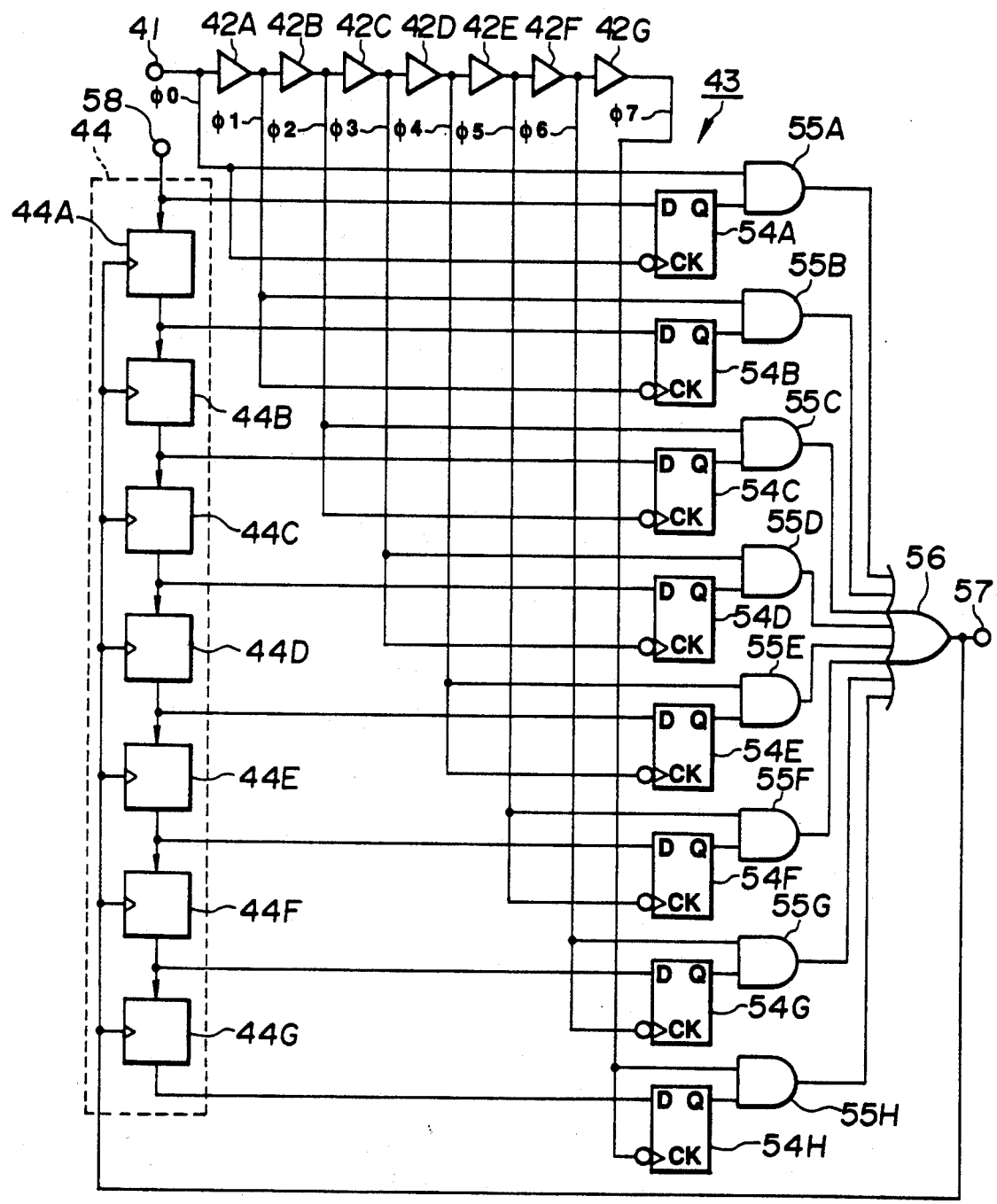
FIG. 10 is a block circuit diagram showing a typical arrangement of the selector in the apparatus shown in FIG. 9.
Figure 11:
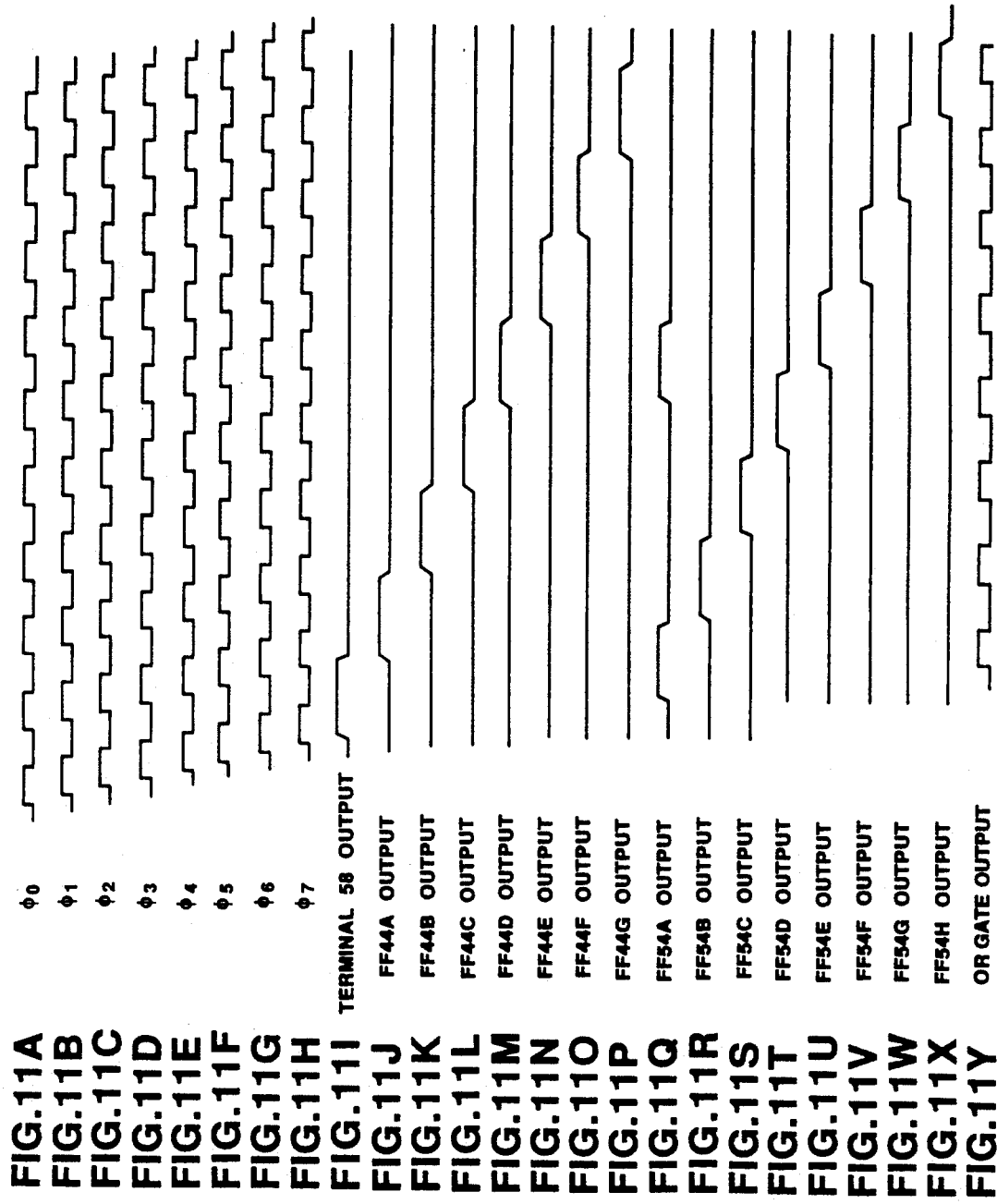
FIGS. 11A–11Y are a timing chart illustrating the operation of the selector shown in FIG. 10.

Referring to FIG. 10, the selector 43 for selecting the outside clocks $\phi_0$, $\phi_1$, $\phi_2$, . . . comprises D-flipflops 54A to 54H, AND gates 55A to 55H and OR gate 56. The outside clocks $\phi_0$, $\phi_1$, $\phi_2$ . . . (FIGS. 11A to 11H) are supplied to inputs of the AND gates 55A to 55H, respectively, of the selector 43, and are inverted and supplied to clock inputs CK of D-flipflops 54A to 54H, respectively. The outputs of the D-flipflops 54A to 54H are supplied to the other inputs of the AND gates 55A to 55H, respectively. The outputs of the AND gates are supplied to OR gate 56.

The D-flipflops 44A to 44G constitute a shift register 44 for sequentially selecting the outside clocks $\phi_0$, $\phi_1$, $\phi_2$, . . . . This shift register 40 is actuated by clocks outputted from OR gate 56.

The outputs from the points between the D-flipflops 44A to 44G are supplied to data input terminals D of the D-flipflops 54A to 54H of the selector 43.

To phase correct the outside clocks, data "1" is supplied to a terminal 58. This data "1" is transmitted through D-flipflops 44A to 44G, as shown in FIGS. 11I to 11P. Thus the D-flipflops 44A to 44G sequentially output "1".

With a falling edge of the outside clocks $\phi_0$, $\phi_1$, $\phi_2$, . . . outputted with different phases from the points between the delay circuits 42A to 42G, the outputs from the points between the D-flipflops 44A to 44G are supplied to the D-flipflops 54A to 54G.

The D-flipflops 54A to 54H sequentially output "1", as shown in FIGS. 11Q to 11X. As the D-flipflops 54A to 54H thus output "1", the associated AND gates 55A to 55H are opened so that the outside clocks $\phi_0$ to $\phi_7$ are sequentially outputted via AND gates 55A to 55G and OR gate 56 at output terminal 57, as shown in FIG. 11Y.

With the above described embodiment, the outside clocks $\phi_0$, $\phi_1$, $\phi_2$, . . . are sequentially selected by using the shift register 44 consisting of the D-flipflops 44A to 44G. With the use of the shift register 44 consisting of the D-flipflops 44A to 44G, spurious signals are not outputted from the D-flipflops 44A to 44G during a transition between clock selections. Thus, malfunctions such as would occur when the outside clocks $\phi_0$, $\phi_1$, $\phi_2$, . . . are selected sequentially by a counter may be prevented.

While the outside clocks $\phi_0$, $\phi_1$, $\phi_2$, . . . are sequentially selected by using the shift register 44 in the above described embodiment, it is also possible to use a gray code counter to sequentially select the outside clocks, yet prevent a malfunction between count values, as described below.

Figure 12:
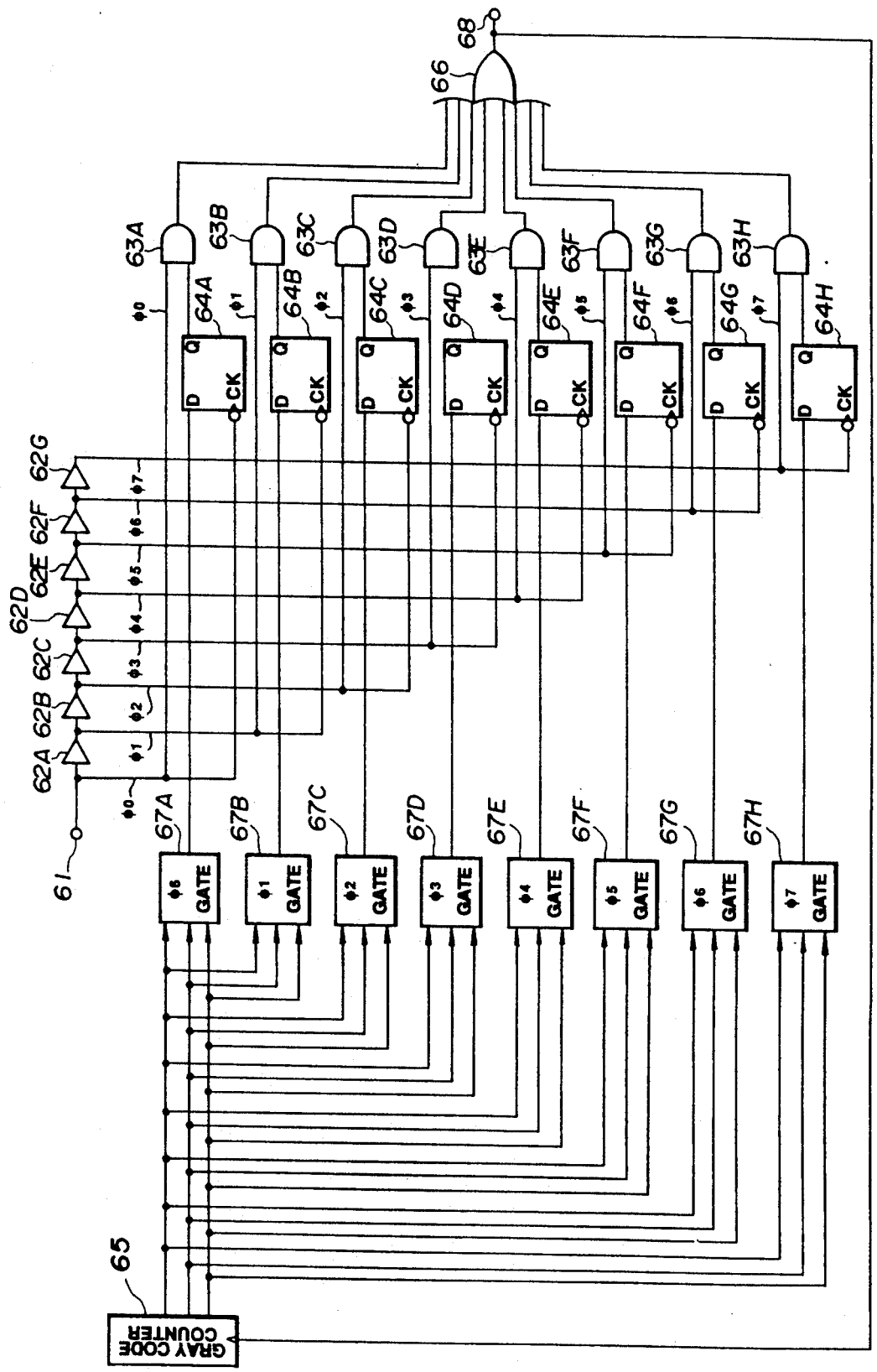
FIG. 12 is a block circuit diagram showing a modified arrangement of the selector in the apparatus shown in FIG. 9.

FIG. 12 shows a selector embodiment using a gray code counter. In FIG. 12, the outside clocks are supplied to an input terminal 61 and, for example, eight (8) outside clocks $\phi_0$ to $\phi_7$ having respective different phases are extracted between delay circuits 62A to 62G. These outside clocks $\phi_0$ to $\phi_7$ are supplied to input terminals of AND gates 63A to 63H, respectively, and are inverted and supplied to clock input terminals CK of D-flipflops 64A to 64H, respectively.

A selected one of the outside clocks is outputted from an OR gate 66 to an output terminal 68.

A gray code counter 65 is incremented in accordance with a gray code in response to clocks outputted from output terminal 68. In a gray code, only one bit is changed per increment. For example, in a 3-bit gray code, data are output in the following manner:

| 0 | "000" |
|---|---|
| 1 | "001" |
| 2 | "011" |
| 3 | "010" |
| 4 | "110" |
| 5 | "111" |
| 6 | "101" |
| 7 | "100" |

The count values from the gray code counter 65 are supplied to gate circuits 67A to 67H.

The outputs of the gate circuits 67A to 67H are "1" when the inputs are "000", "001", "011", "010", "110", "111", "101" and "100", respectively.

When the gray code counter 65 is incremented, the gate circuits 67A to 67H output "1" sequentially.

The outputs of the gate circuits 67A to 67H are supplied to data input terminals of the D-flipflops 64A to 64H.

On a falling edge of the eight (8) outside clocks $\phi_0$ to $\phi_7$ having different phases from the points between the delay circuits 62A to 62G, the outputs of the gate circuits 67A to 67H are supplied to the D-flipflops 64A to 64H, respectively. The outputs of the D-flipflops 64A to 64H are supplied to AND gates 63A to 63H, respectively.

The outputs of the D-flipflops 64A to 64H become "1" sequentially.

The AND gates 63A to 63H are opened during the time when the outputs of the D-flipflops 64A to 64H are "1". The Outside clocks $\phi_0$ to $\phi_7$ are sequentially outputted by means of AND gates 63A to 63H and OR gate 66.

When the outside clocks $\phi_0$, $\phi_1$, $\phi_2$, . . . are sequentially selected by using the gray code counter 65, spurious count values are not outputted during the transition between count values, since only one bit is changed per transition in the gray code. In this manner, it is possible to prevent a hazard occurring.

Meanwhile, if the disc suffers from defects, the reproduced reference clocks fluctuated significantly. Also, if noise is mixed into the reproduced reference clocks, the reproduced reference clocks are distorted. Therefore, phase compensation, that is, correction of the outside clocks with high reliability cannot be performed by detecting the peak of the sampling values of the reproduced reference clocks only once. For phase compensation of the outside clock with high reliability, it is necessary to detect the peak of the sampling values of the reproduced reference clocks several times and to determine the optimum phase of the outside clocks by using the phase for the peak value obtained from several detections.

Figure 13:
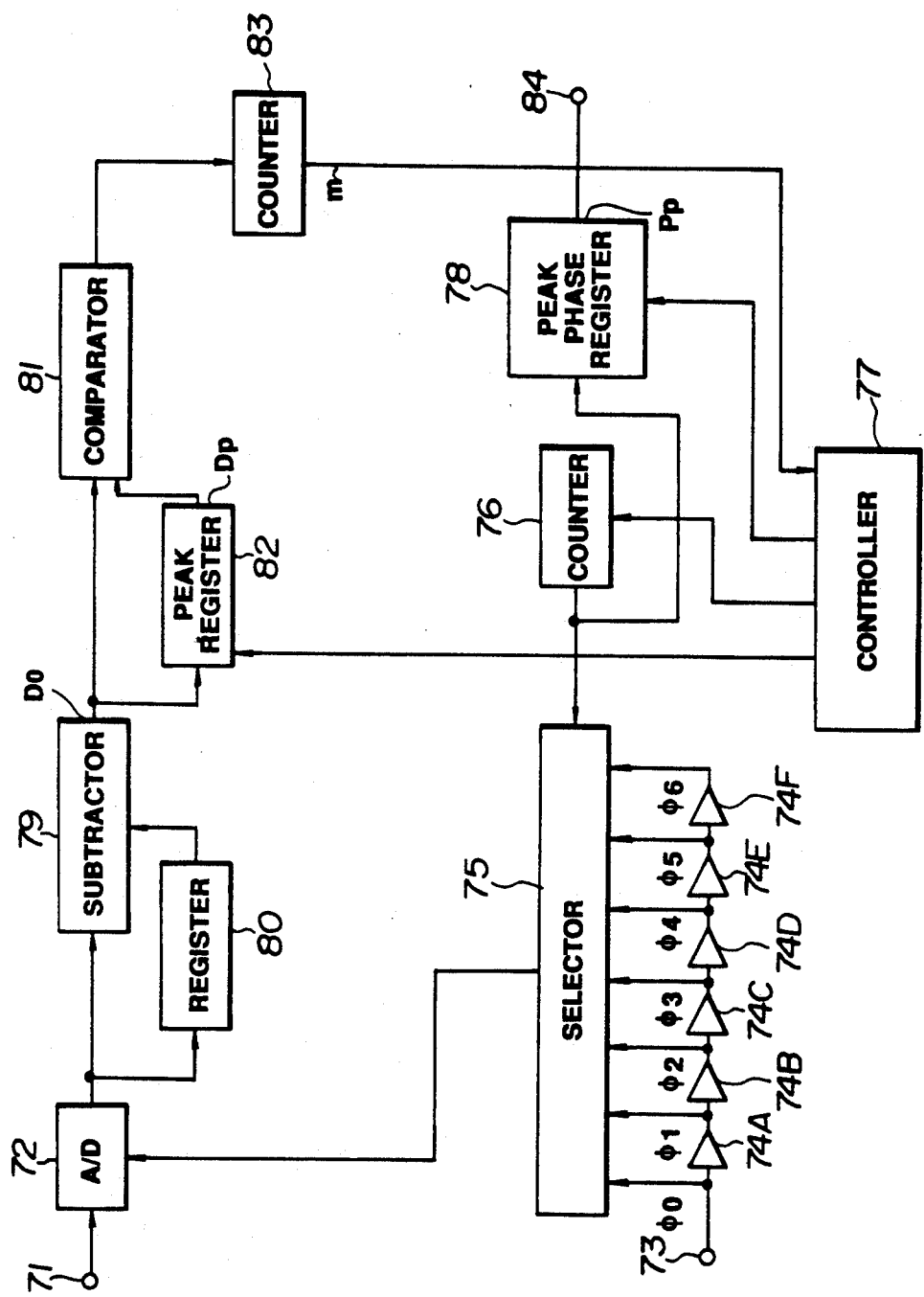
FIG. 13 is a block circuit diagram showing another modified embodiment of an apparatus for generating data-reproducing clock signals according to the present invention.

In FIG. 13, which shows another embodiment of apparatus for generating data-reproducing clock signals according to the present invention, the aforementioned reference clock signals are supplied to an input terminal 71. The reproduced signals of the reference clocks from the input terminal 71 are supplied to an A/D converter 72. An outside clock selected at a selector 75 is also supplied to the A/D converter 72. The reproduced signal of the reference clocks from input terminal 71 is sampled by using the outside clock selected at the selector 75.

Outside clocks formed on the basis of a reproduced signal of the clock pits in the servo region 1 shown in FIG. 5 are supplied to an input terminal 73. The outside clocks from input terminal 73 are passed through a series connection of a plurality of, herein six, delay circuits 74A to 74F, and the outputs from the points between the delay circuits 74A to 74F are supplied to the selector 75, to which a select control signal is also supplied from a counter 76. The output of selector 75 is supplied as a selected sampling clock to the A/D converter 72.

Outside clocks $\phi_0$ to $\phi_6$ having respective different phases are extracted from the points between the delay circuits 74A to 74F. The value of the counter 76 is set as a function of the output from controller 77. The selection of the selector 75 is established by the value of the counter 76. The outside clock selected by the selector 75 is supplied to A/D converter 72.

The value of the counter 76 is supplied to a peak value phase register 78 which is controlled as a function of the output from controller 77. An output terminal 84 is led out from the peak value phase register 78.

A sampling value output of the A/D converter 72 is supplied to a subtraction circuit 79 directly and by means of a register 80. The subtraction circuit 79 and the register 80 are used to find a difference of the sampling values outputted from the A/D converter 72.

The output of the subtraction circuit 79 is supplied to an input terminal of a comparator 81, and to a peak register 82, the contents of which is determined by the output of the controller 77. The output of the peak register 82 is supplied to the other input terminal of the comparator 81.

The output of the comparator 81 is supplied to a counter 83, the output of which is supplied to controller 77.

Figure 14:
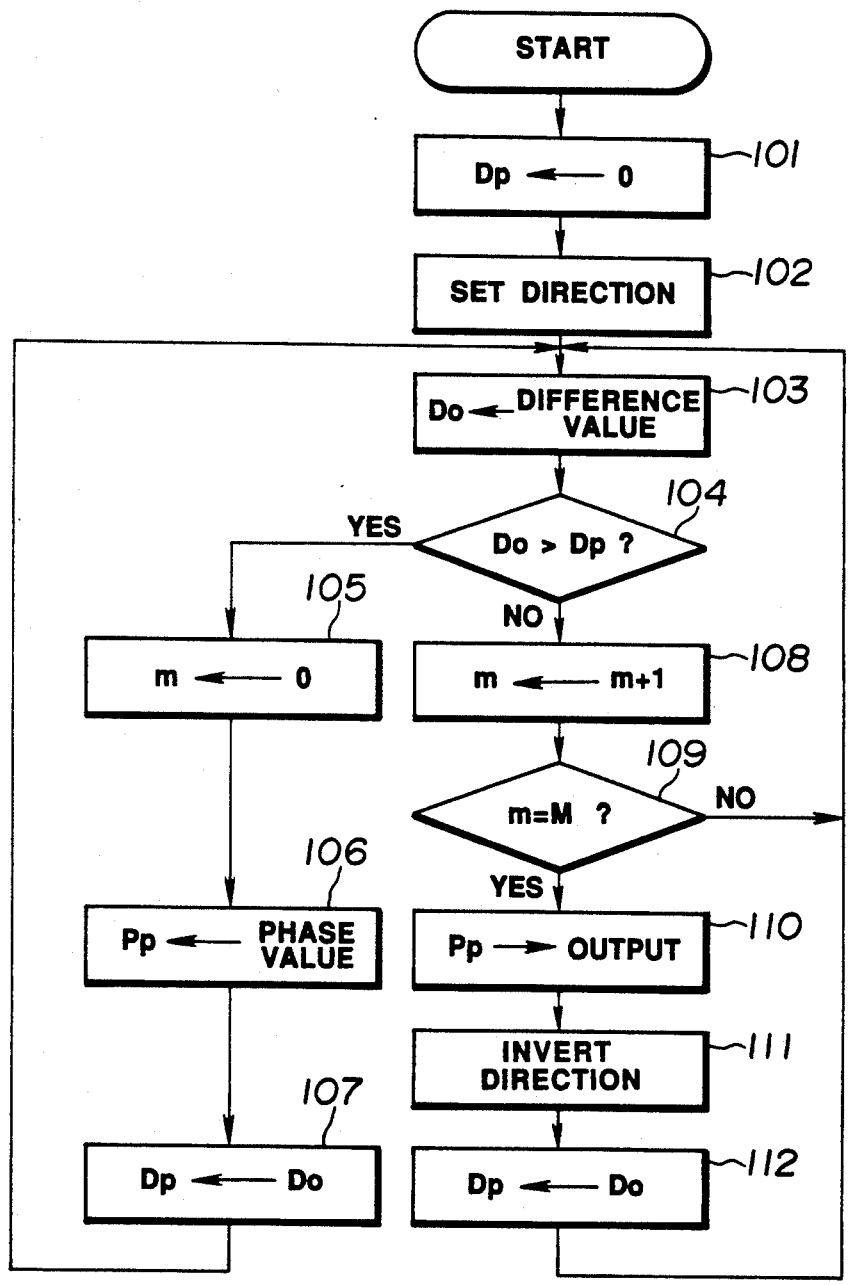
FIG. 14 is a flow chart illustrating the operation of the apparatus shown in FIG. 13.

FIG. 14 is a flow chart for the present embodiment, wherein variables and constants are used in the following manner:

$D_0$ is a variable indicating the difference value outputted from subtraction circuit 79;

$D_p$ is a variable indicating the phase value stored in peak register 82;

$P_p$ is a variable indicating the phase value stored in peak value phase register 78;

M is a constant indicating the number of times of protection following peak value phase detection, that is, the predetermined number of consecutive detections for which the phase associated with a maximum value of differences between reference clock sampling values must be exceeded so that phase correction of the outside clock signals is reliable; and m is a variable indicating the count value of counter 83.

First, the peak value $D_p$ of peak register 84 is initialized to "0" at step 101.

The counting direction of the counter 76 is set at step 102 so that the counter 76 will be incremented in the positive direction.

"0" is first outputted from counter 76 and the outside clock $\phi_0$ is selected at selector 75. This outside clock $\phi_0$ is supplied to A/D converter 72 and the reproduced reference clocks are sampled by using the outside clock $\phi_0$.

In the subtraction circuit 79, the difference $D_0$ of the sampling values when sampling by using the outside clock $\phi_0$ is found at step 103.

In the comparator 81, it is checked at step 104 if the difference $D_0$ is larger than the peak value $D_p$ of peak register 82.

Since the peak value $D_p$ of peak register 82 is initially set to "0" at step 101, the difference $D_0$ is larger than the peak value $D_p$ of peak register 82. If the difference $D_0$ is larger than the peak value $D_p$, the count value m of counter 83 is reset to "0" at step 105.

The value of the counter 76 at this time is stored at step 106 in peak value phase register 78. Since the value of counter 76 is "0" at this time, the phase value $P_p$ stored in the peak value phase register 78 is 0. The difference value $D_0$ at this time is stored at step 107 in peak register 82. The flow then goes to step 103.

The counter 76 is incremented to "1" and the outside clock $\phi_1$ is selected at selector 75. This outside clock $\phi_1$ is supplied to A/D converter 72 and the reproduced reference clock is sampled by using the outside clock $\phi_1$.

In the subtraction circuit 79, the difference, again referred to as $D_0$, of the sampling values obtained by sampling with the outside clock $\phi_1$ is found at step 103.

In the comparator 81, it is checked at step 104 if the difference value $D_0$ is larger than the peak value $D_p$ of peak register 82.

If the phase associated with the peak value of the difference is not exceeded, (overshot) in the current flowchart iteration, the difference $D_0$ is larger than the peak value $D_p$ of peak register 82. If the difference $D_0$ is larger than the peak value $D_p$, the count value m of the counter 83 is reset to "0" at step 105.

The count value at counter 76 at this time is stored in peak value phase register 78 at step 106. Since the value of counter 76 at this time is "1", the phase value $P_p$ stored in peak value phase register 78 is "1".

The difference $D_0$ at this time is stored in peak register 82. The flow then goes to step 103.

The counter 76 is then incremented to "2", "3", ..., the outside clocks $\phi_2$, $\phi_3$, ... are sequentially selected by selector 75 and supplied to A/D converter 72 and the reproduced reference clocks are sampled with the outside clocks $\phi$, $\phi_3$, ....

In the subtraction circuit 79, the difference $D_0$ of the sampling values obtained by sampling with outside clocks $\phi_2$, $\phi_3$, ... is sequentially found at step 103. In the comparator 81, it is sequentially checked at step 104 if the difference $D_0$ is larger than the peak value $D_p$.

If the phase associated with the peak value of the difference is exceeded, the difference $D_0$ is smaller than the peak value $D_p$ in peak register 82.

If the difference $D_0$ is smaller than the peak value $D_p$, counter 83 is incremented at step 108.

It is checked at step 109 if the count value of counter 83 has reached a predetermined number of times of protection (e.g., M=3).

If the count value at counter 83 is less than the predetermined protection number M, the flow goes to step 103.

The sampling value $D_0$ when sampling with the next outside clock is found at step 103 and the difference $D_0$ is compared to the peak value $D_p$ at step 104.

If the phase associated with the peak value is exceeded, the difference $D_0$ is again smaller than the peak value $D_p$, so that the counter 83 is further incremented at step 108.

When the count value of counter 83 reaches the predetermined number M, the phase value $P_p$ stored in peak value phase register 78 is outputted at output terminal 84 at step 110.

The count direction of counter 76 is inverted at step 111 so that the counter 76 will be incremented in the negative direction, that is, decremented.

The difference $D_0$ at this time is stored in peak register 82 at step 112. The flow then goes to step 103 but the phase correction (delay) of the outside clocks will be decremented during the next flowchart iteration.

The above described detection operation is repeated several times.

The operation of the present embodiment is hereinafter explained.

The reproduced reference clock signals from input terminal 71 are sequentially sampled by using outside clocks $\phi_0$ to $\phi_6$ sequentially selected by selector 75. When the clock of the maximum recording frequency is employed as the reference clock, the difference of its sampling values is maximum, that is, the reference clocks and the outside clocks are in phase. Thus the outside clocks may be phase-compensated by detecting the outside clock phase when the difference of the sampling values of the reference clocks reaches a peak, that is, maximum value.

When the phase of the outside clock is sequentially incremented in one direction and the difference approaches a peak value, the current difference is larger than the preceding difference indicating that the reference clocks and outside clocks are more in phase with each other. When the difference retreats from a peak value, the current difference is smaller than the preceding difference indicating that the reference clocks and outside clocks are more out of phase with each other.

Thus the overall peak value of the differences may be detected if the peak value of the preceding differences is stored in peak register 82, the current difference is compared with the preceding peak value stored in peak register 82, and the current difference is itself stored in peak register 82 when it is larger than the preceding peak value stored in peak register 82. The difference is determined to have reached a peak value when the current difference is less than the preceding peak value stored in peak register 82.

However, since frequently the second segment on the magneto-optical disc carrying the reference clock signals may be defective or noise may be contained in the reproduced reference clocks, the peak value of the difference values obtained after only one peak value detection operation has low reliability. To obtain a reliable peak value, it is therefore necessary to repeat the above described operation of detecting a peak value of the differences several times. However, protracted processing would be necessitated if the operation of detecting a peak value of the differences by sequentially incrementing the phase of the outside clock in one direction were repeated several times, starting at the beginning of the flowchart for each detection operation.

Thus, to obtain a reliable peak value while avoiding protracted processing, after a peak value of the differences is detected, the phase of the outside clock is incremented in the opposite direction during the next operation to detect a peak of the differences. Detection with phase increment inversion is repeated several times. When the phase of the outside clock is incremented in the opposite direction after detection of a peak value of the differences the processing time to obtain a reliable peak value is greatly reduced since initialization time becomes unnecessary and since the phase of the outside clocks need not be incremented repeatedly to get to the proper range for a peak value detection of the next difference values. Also, since it is likely that the peak value of the next difference is of approximately the same phase as the peak value of the preceding difference, the peak value of the next difference may be detected without many flowchart iterations, that is, increments of phase of the outside clock.

More specifically, when the counter 76 of FIG. 13 is incremented in the sequence 0, 1, 2, 3 . . . , as shown in FIG. 15A, output clocks $\phi_0$, $\phi_1$, $\phi_2$, . . . , are sequentially outputted from selector 75 so that the phase delay amounts are progressively larger, as shown in FIG. 15C. FIG. 15B shows the outside clocks supplied to input terminal 73.

The outside clocks $\phi_0$, $\phi_1$, $\phi_2$, . . . , selected at selector 75, are sequentially supplied to A/D converter 72. The reproduced signals of the reference clocks are sequentially sampled at A/D converter 72 with the outside clocks $\phi_0$, $\phi_1$, $\phi_2$, . . . , as shown in FIG. 15D. In this manner, sampling values using the outside clocks $\phi_0$, $\phi_1$, $\phi_2$, . . . may be obtained sequentially.

In the subtraction circuit 79 and the register 80, the differences $d_0$, $d_1$, $d_2$, . . . of the sampling values are found sequentially, as shown in FIG. 15E. 10 In peak register 82, the peak value of the preceding differences is stored. In the comparator 81, the peak value of the preceding differences stored in peak register 82 is compared to the difference of the current sampling values.

It is noted that, if the direction of phase incrementing of the outside clocks is that of approaching a peak of the difference values, then the difference of the current sampling values is larger than the peak value of the preceding differences stored in peak register 82. When the phase associated with the peak of the difference values is exceeded, the difference of the current sampling values is less than the peak of the preceding difference values stored in peak register 82. Thus it may be detected that the peak value has been reached.

When the difference of the current sampling values is larger than the peak of the preceding differences, the value of the peak register 82 is updated to the difference of the current sampling values, at the same time that the value of the counter 76 is stored in peak value phase register 78. At this time, counter 76 continues counting in the same direction.

Figure 15:
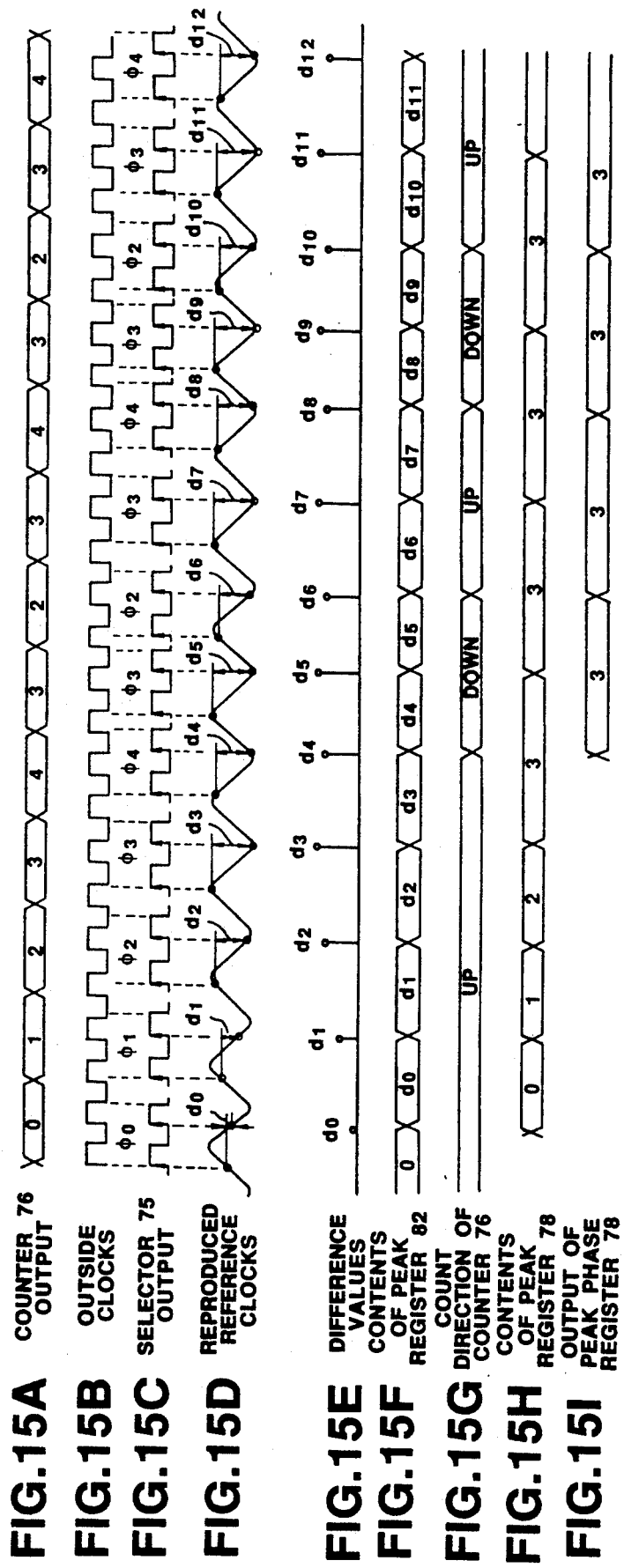
FIGS. 15A–15I and 16A–16I are timing charts illustrating the operation of the apparatus shown in FIG. 13.

Thus, in FIG. 15, the differences $d_0$, $d_1$, $d_2$ and $d_3$ of the current sampling values are larger than the peak of the preceding difference values while the counter 76 counts from "0" to "3". During this time interval, the value of the peak register 82 is sequentially updated to $d_0$, $d_1$, $d_2$ and $d_3$, as shown in FIG. 15F. Simultaneously, the values "1", "2" an "3" in the counter 76 (FIG. 15A) are sequentially stored in peak value phase register 78, as shown in FIG. 15H.

When the difference of the current sampling values becomes smaller than the peak of the preceding difference values, the contents of the peak value phase register 78 are outputted as the peak value phase, at the same time that the counting direction of the counter 76 is inverted. The value in the peak register 82 is updated to the difference of the current sampling values.

Thus, in the example of FIG. 15, when the counter 76 (FIG. 15A) counts from "3" to "4", the difference $d_4$ of the current sampling value becomes smaller than the peak of the preceding differences which is the difference $d_3$. At this time, the value "3" stored in peak value phase register 78 is outputted as the peak value phase at output terminal 84, as shown in FIG. 15I, and, at the same time, the count direction of the counter 76 is inverted, as shown in FIG. 15G. In this manner, the phase $\phi_3$ which will give the peak $d_3$ is detected. The value of the peak register 82 is updated to the difference $d_4$ of the current sampling values, as shown in FIG. 15F.

The counting direction of the counter 76 is inverted during the next detection operation.

Thus, as shown in FIG. 15A, after the counter value of "4", the next counter value is "3". The peak value stored in the peak register 82 is compared to the difference of the current sampling values. As shown in FIG. 15F, the value in peak register 82 at this time is $d_4$, which is less than the difference of the current sampling values, $d_5$, as shown in FIG. 15E. Thus, as shown in FIG. 15F, the value in peak register 82 is updated from $d_4$ to $d_5$, at the same time that the value "3" of the counter 76 is stored in peak value phase register 78.

The value of the counter 76 next becomes "2". As shown in FIG. 15E, the difference of the current sampling values is $d_6$, which is smaller than the value $d_5$ in peak register 82. Thus, as shown in FIG. 15I, the value "3" stored in peak value phase register 78 is outputted at output terminal 84 as the peak value phase while the counting direction of the counter 76 is inverted, as shown in FIG. 15G.

The detection operation is repeated and results in sequentially outputting the peak value phase "3", "3", "3" ... at output terminal 84, as shown in FIG. 15I.

The example of FIGS. 15A-15I shows a case in which the disc is free of defects. The phase for the peak value detected at each peak value detection operation, is always $\phi_3$, so that the peak value phase "3" is outputted at all times at output terminal 84.

If a defect is present in the disc, the reference clock recorded at the site of the defect is in error. With the present embodiment, no error is produced in the peak value phase even when a reference clock is in error, as will be explained. But first, outputting a result based on only one peak value detection operation when the disc contains a reference clock in error will be described.

Figure 16:
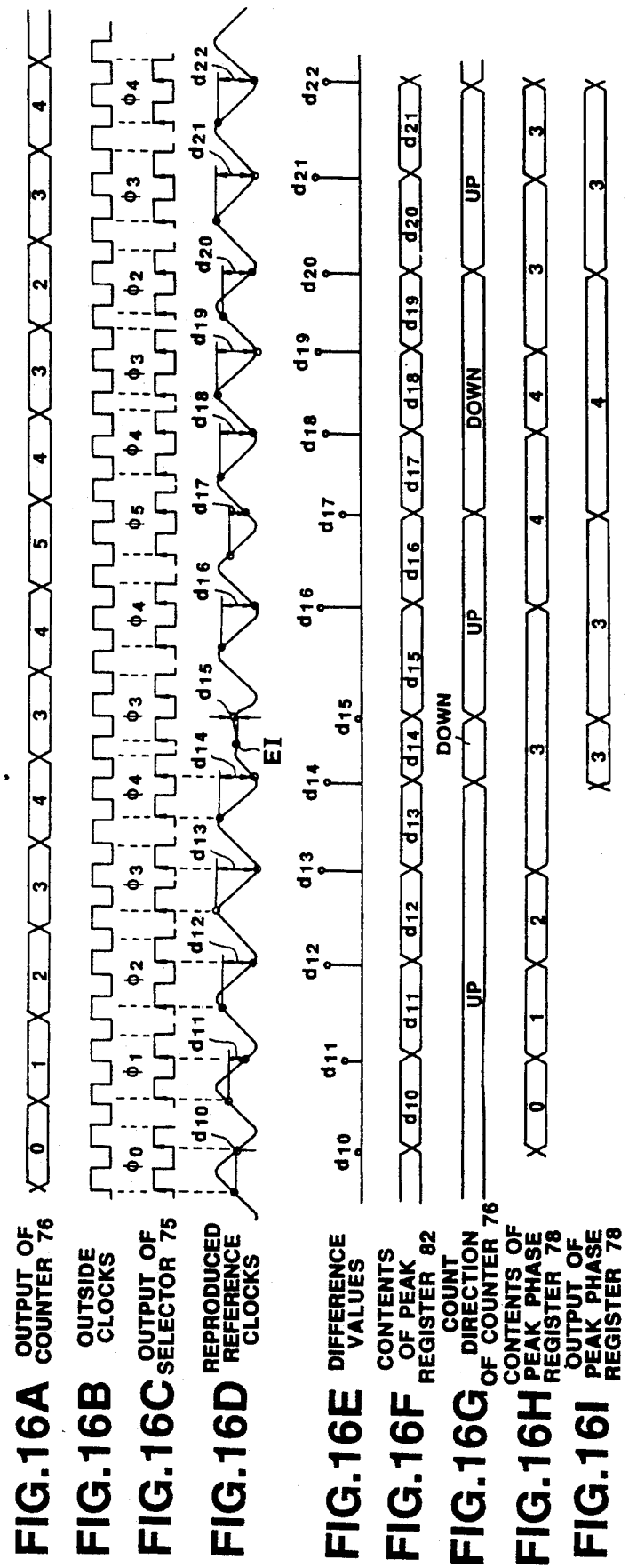

In FIG. 16D, the reference clock shown at EI is in error. When the reference clock shown at EI is in error, the difference $d_{15}$ is significantly reduced in magnitude, as shown in FIG. 16E. This difference $d_{15}$ is obtained when sampling the reference clock with the outside clock $\phi_3$, and without the error at EI, would be a peak value.

When the values "0" to "3" are supplied by the counter 76 as shown in FIG. 16A while the outside clocks, shown in FIG 16B, are supplied to input terminal 73, the output of selector 75, shown in FIG. 16C, is supplied to A/D converter 72 and the differences $d_{10}$, $d_{11}$, $d_{12}$ and $d_{13}$ of the current sampling values become progressively larger. Thus, as shown in FIG. 16F, the values in the peak register 82 are sequentially updated to $d_{10}$, $d_{11}$, $d_{12}$ and $d_{13}$ and, as shown in FIG. 16H, the values "1", "2" and "3" of the counter 76 at this time are sequentially stored in peak value phase register 68.

When the counter 76 counts from "3" to "4" the difference $d_{14}$ of the current sampling values becomes smaller than the peak of the preceding difference values, which is the difference value $d_{13}$, so that, as shown in FIG. 16I, the value "3" stored in peak value phase register 78 is outputted from output terminal 84 as the peak value phase, at the same time that the counting direction of the counter 76 is inverted, as shown in FIG. 16G. The value of peak register 82 is updated to the difference $d_{14}$ of the current sampling values, as shown in FIG. 16F.

Since the count direction of counter 76 has been inverted, the next count value of counter 76 is "3". As shown in FIG. 16F, the value in the peak register 82 at this time is $d_{14}$. The difference of the current sampling values, $d_{15}$, is extremely small in magnitude, since it was calculated using a sampling value of a reference clock in error. The difference $d_{15}$ of the current sampling values is smaller than the peak $d_{14}$ of the preceding difference values, as shown in FIG. 16E. Thus, as shown in FIG. 16I, the value "3" stored in peak value phase register 78 is outputted at output terminal 84 as the peak value phase and, as shown in FIG. 16G, the counting direction of the counter 76 is inverted, and, as shown in FIG. 16F, the value of the peak register 82 is updated to the difference $d_{15}$ of the current sampling value.

Since the count direction of counter 76 has been inverted, the next count value of counter 76 is "4". The peak value stored in peak register 82 is compared to the difference of the current sampling values. Referring to FIG. 16F, the value in peak register 82 at this time is $d_{15}$, while the difference of the current sampling values is $d_{16}$, with the difference $d_{16}$ being larger than the difference $d_{15}$ in the peak register 82, as shown in FIG. 16E. Thus, as shown in FIG. 16F, the value of the peak register 82 is updated from $d_{15}$ to $d_{16}$, at the same time that, as shown in FIG. 16H, the value "4" of the counter 76 is stored in peak value phase register 78.

The value of counter 76 next becomes "5". As shown in FIG 16F, the value in the peak register 82 at this time is $d_{16}$, which is larger than the difference $d_{17}$ of the current sampling values, as shown in FIG. 16E. Thus, as shown in FIG. 16I, the value "4" stored in peak value phase register 78 is outputted from the output terminal 84 as the peak value phase, at the same time that, as shown in FIG. 16G, the counting direction of the counter 76 is inverted.

Outputting a result based on only one peak value detection operation when the error EI is present results in sequentially outputting the detected peak value phases "3", "3", "4", "3" ..., as shown in FIG. 16I. That is, the error EI causes the erroneous output "4". These peak value phases may be averaged to produce the optimum peak value phase $\phi_3$ as will be described below with reference to FIG. 20.

It is assumed in the foregoing description that the phase associated with the peak value is determined to have been exceeded as soon as the difference of the current sampling values becomes smaller than the preceding peak and, based on this assumption, the phase of the outside clock for the peak value is outputted at the same time as the phase incrementing direction for the outside clock is inverted. However, noise may introduce errors so if the phase associated with the peak value is deemed to be exceeded the instant that the difference of the current sampling values becomes smaller than the preceding peak value, detection may occur erroneously. For this reason, a counter 83 is provided for counting the output of the comparator 81 and, if the difference of the current sampling values becomes smaller than the preceding peak value M consecutive times, such as three times, the phase associated with the peak value is reliably determined to have been exceeded, so that the phase of the outside clock associated with the peak value is outputted at the same time that the outside clock phase incrementing direction is inverted. This error protection sequence is implemented by steps 108 and 109 in the flow chart shown in FIG. 14. Thus, with the present embodiment, no error is produced in the peak value phase even when a reference clock signal is in error or noise has introduced errors.

Figure 17:
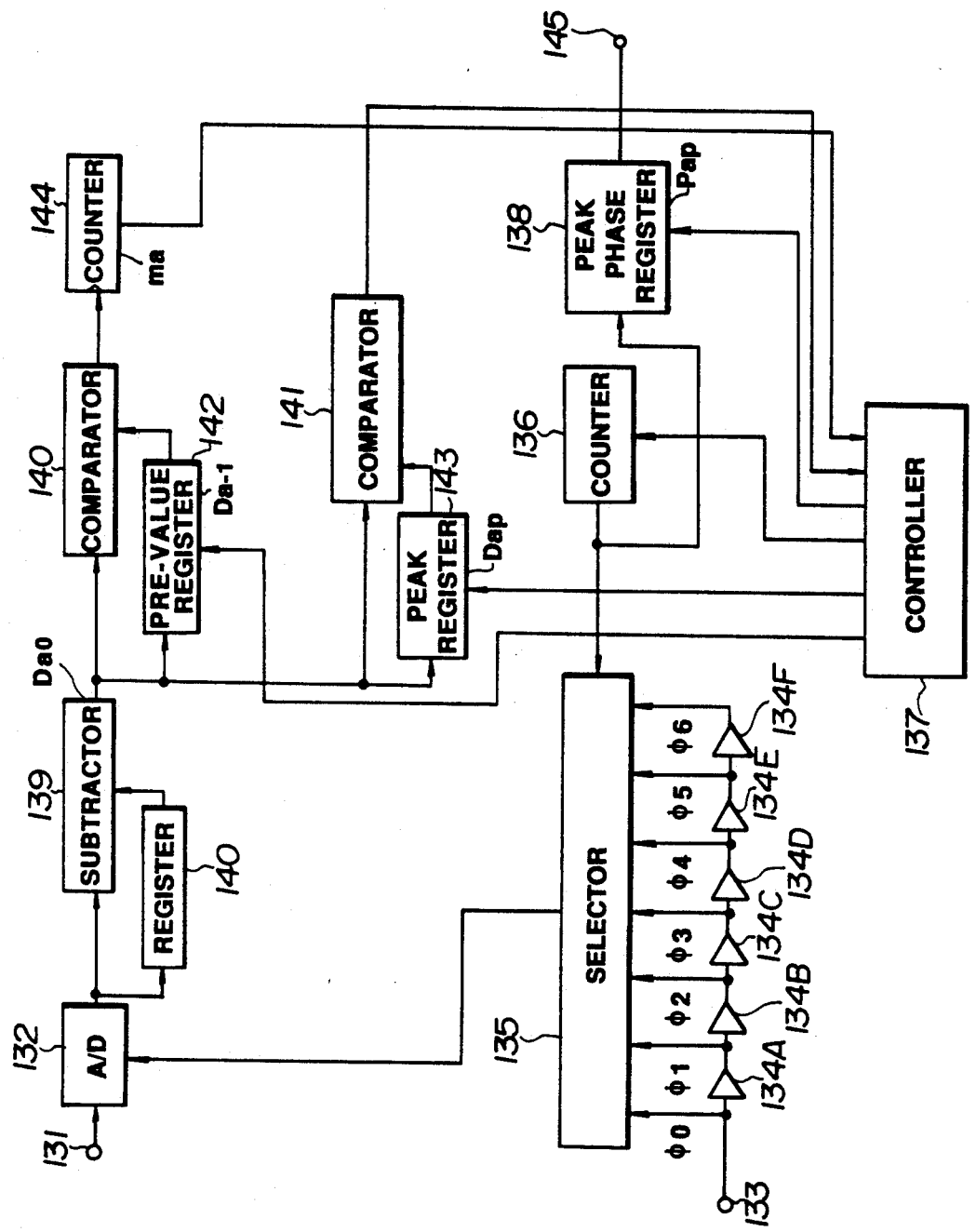
FIG. 17 is a block circuit diagram showing a further modified embodiment of an apparatus for generating data-reproducing clock signals according to the present invention.

FIG. 17 illustrates a further modified embodiment of an apparatus for generating data-reproducing clock signals according to the present invention.

FIG. 17, reference clocks reproduced from a magneto-optical disc are supplied to an input terminal 131. The reproduced signals of the reference clocks from this input terminal 131 are supplied to an A/D converter 132. Outside clocks selected by selector 135 are also supplied to A/D converter 133. The reproduced signals of the reference clocks from the input terminal 131 are sampled by using the outside clocks selected at the selector 135.

Outside clocks formed on the basis of a reproduced signal of the clock pits in the servo region 1 shown in FIG. 5 are supplied to an input terminal 133. The outside clocks from input terminal 133 are passed through a series connection of a plurality of, herein six, delay circuits 134A to 134F, and the outputs of the points between the delay circuits 134A to 134F are supplied to selector 135. Select control signals from a counter 136 are also supplied to selector 135. The outputs of the selector 135 are supplied as sampling clocks to A/D converter 132.

The output values from the counter 136 are supplied to a peak value phase register 138 which is controlled by an output from a controller 137. An output terminal 145 for the peak value phase is led out from peak value phase register 138.

A sampling value from the A/D converter 132 is supplied to a subtraction circuit 139 directly and by means of a register 140. The function of the subtraction circuit 139 and the register 140 is to find the difference of the sampling values outputted from A/D converter 132.

The output of the subtraction circuit 139 is supplied to an input terminal of a comparator 140, to an input terminal of another comparator 141, to a pre-value register 142 and to a peak register 143. An output of the pre-value register 142 is supplied to the other input terminal of comparator 140. An output of the peak register 143 is supplied to the other input terminal of comparator 141.

An output of comparator 140 is supplied to a counter 144, the output of which is supplied to controller 137. An output of comparator 141 is also supplied to controller 137.

Figure 18:
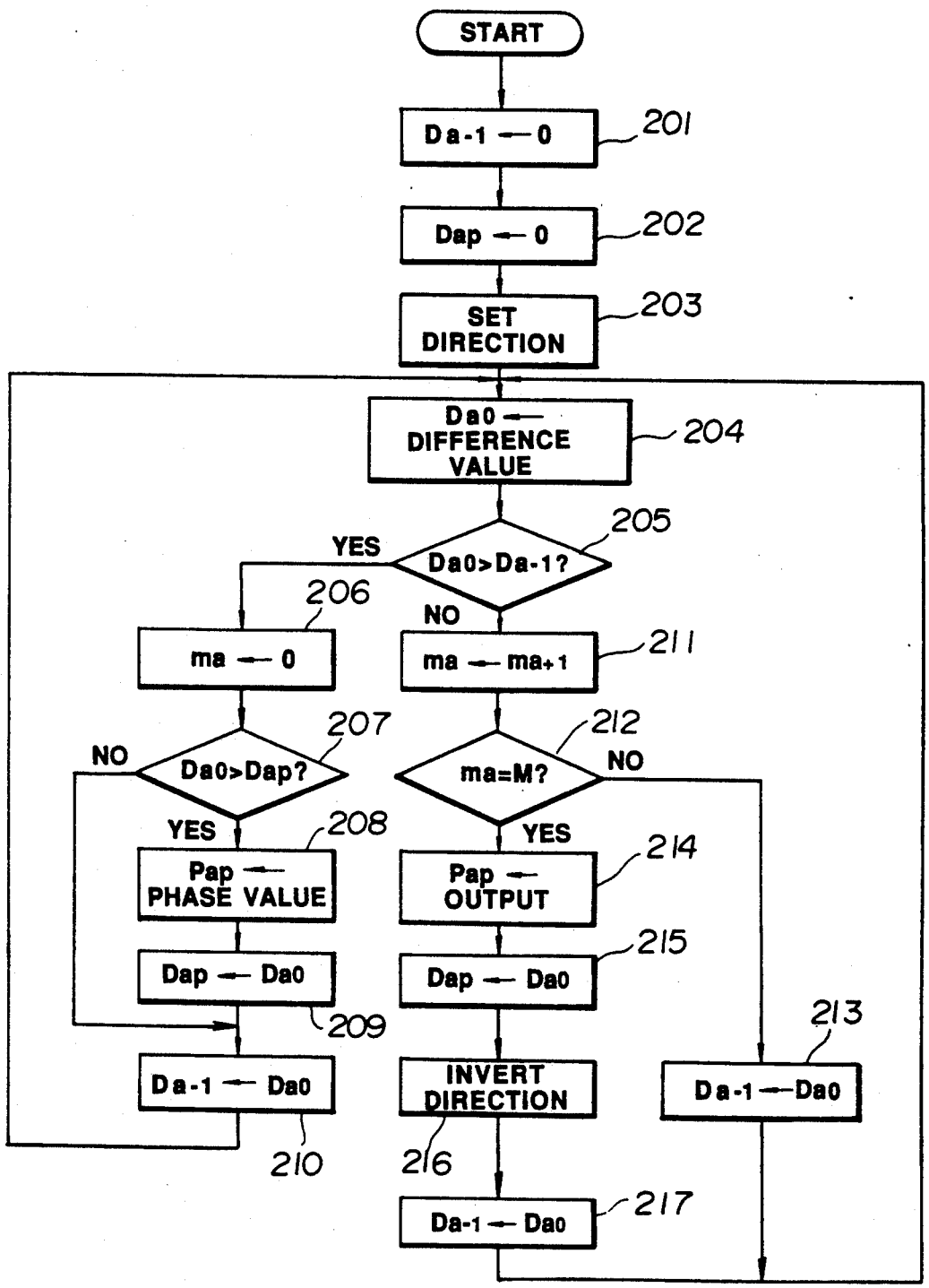
FIG. 18 is a flow chart illustrating the operation of the apparatus shown in FIG. 17.

FIG. 18 is a flow chart for the present embodiment, wherein the variables or constants are set in the following manner:

$D_{a0}$ is a variable indicating the difference outputted from subtracting circuit 139;

$D_{aP}$ is a variable indicating the peak value stored in peak register 143;

$D_{a-1}$ is a Variable indicating the preceding difference stored in pre-value register 142;

$P_{aP}$ is a variable indicating the phase value stored in peak value phase register 138;

Ma is a constant indicating the number of times of protection following peak value phase detection; and ma is a variable indicating the count value of counter 144.

The preceding difference $D_{a-1}$ in pre-value register 142 is initialized to "0" at step 201.

The peak value $D_{aP}$ in peak register 143 is initialized to "0" at step 202.

The counting direction of the counter 136 is set at step 203 to increment the counter 136 in the positive direction.

"0" is first outputted from counter 136 and the outside clock $\phi_0$ is selected by selector 135. This outside clock $\phi_0$ is supplied to A/D converter 132 and the reproduced reference clocks are sampled by using the outside clock $\phi_0$.

In the subtraction circuit 139, the difference $D_{a0}$ of the sampling value obtained by sampling with the outside clock $\phi_0$ is found at step 204.

In the comparator 140, it is checked at step 205 if the difference $D_{a0}$ is larger than the preceding difference $D_{a-1}$ in the pre-value register 142.

Since the preceding difference $D_{a-1}$ in pre-value register 142 was set to "0" in the initialization step 201, the current difference $D_{a0}$ is larger than the preceding difference $D_{a-1}$ in the pre-value register 142. If the difference $D_{a0}$ is larger than the preceding difference $D_{a-1}$, the count value ma in counter 144 is reset to "0" at step 206.

It is checked at step 207 if the difference $D_{a0}$ is larger than the peak value $D_{aP}$ stored in peak register 143.

Since the peak value $D_{aP}$ in peak register 143 was set to "0" in the initialization step 202, the difference $D_{a0}$ is larger than the peak value $D_{aP}$. If the difference $D_{a0}$ is larger than the peak value $D_{aP}$. If the difference $D_{a0}$ is larger than the peak value $D_{aP}$, the value of counter 136 is stored in peak value phase register 138. Since the value of counter 136 at this time is "0", the phase value $D_{aP}$ stored in peak value phase register 138 is "0" after step 208.

The difference $D_{a0}$ is stored at step 209 in the peak value register 142.

The flow then goes to step 204.

The counter 136 is incremented to "1" and the outside clock $\phi_1$ is selected by selector 135. This outside clock $\phi_1$ is supplied to A/D converter 132 and the reproduced reference clocks are sampled by using the outside clock $\phi_1$.

In the subtractor 139, the difference value $D_{a0}$ of the sampling values obtained by sampling with the outside clock $\phi_1$ is found at step 204.

In the comparator 140, it is checked at step 205 if the difference $D_{a0}$ is larger than the preceding difference $D_{a-1}$ in the pre-value register 142.

If the phase associated with the peak value of the difference is not exceeded, the difference $D_{a0}$ is larger than the preceding difference $D_{a-1}$.

If the difference $D_{a0}$ is larger than the preceding difference $D_{a-1}$, the count value ma of counter 144 is reset to "0" at step 206.

It is then checked at step 207 if the difference $D_{a0}$ is larger than the peak value $D_{aP}$ stored in peak register 143.

If the phase associated with the peak value of the difference is not exceeded, the different $D_{a0}$ becomes larger than the peak value $D_{aP}$. If the difference $D_{a0}$ is larger than the peak value $D_{aP}$, the value of counter 136 is stored in peak value phase register 138. Since the value of counter 136 at this time is "1", the phase value $P_{aP}$ stored in peak value phase register 138 is "1" at step 208.

The difference $D_{a0}$ is stored in peak register 143 at step 209 and in pre-value registers 142 at step 210.

The flow then goes to step 204.

If the difference $D_{a0}$ is smaller than the peak value $D_{aP}$ stored in peak register 143 at step 207, the flow goes to step 210 and the difference $D_{a0}$ is stored in pre-value register 142.

Subsequently, the counter 136 is incremented to "2", "3" ..., the outside clocks $\phi_2$, $\phi_3$, ... are sequentially selected by selector 135 and supplied to A/D converter 132 and the reproduced reference clocks are sampled by using the outside clocks $\phi_2$, $\phi_3$ ....

In the subtraction circuit 139, the difference $D_{a0}$ of sampling by using the outside clocks $\phi_2$, $\phi_3$ ... is sequentially found at step 204 and, in the comparator 140, it is checked at step 205 if the difference $D_{a0}$ is larger than the preceding difference $D_{a-1}$.

If the phase associated with the peak value of the difference is exceeded, the difference $D_{a0}$ is smaller than the preceding difference $D_{a-1}$.

When the difference $D_{a0}$, is smaller than the preceding difference value $D_{a-1}$, counter 144 is incremented at step 211.

It is then checked at step 212 if the count value of the counter 144 has reached a predetermined number of times of protection (e.g., Ma=3).

If the count value of the counter 144 is below the predetermined number of times of protection Ma, the difference $D_{a0}$ is stored in pre-value register 142. The flow then goes to step 204.

The difference value $D_{a0}$ from sampling by using the next outside clock is found at step 204 and the difference De is compared at step 205 to the preceding difference $D_{a-1}$.

If the phase associated with the peak value is exceeded, the difference $D_{a0}$ again becomes smaller than the preceding difference $D_{a-1}$, so that the counter 144 is incremented further in step 211.

When the count value of the counter 144 reaches the predetermined number of times of protection Ma, it is determined that the phase associated with the peak has been exceeded due to consecutive montonic decrease of the differences of the reference clock sampling values, so that the phase value $P_{aP}$ stored in peak value phase register 138 is outputted at output terminal 145 at step 214.

The difference $D_{a0}$ is stored in peak register 143 at step 215.

The counting direction of the counter 136 is inverted at step 216.

The difference value $D_{a0}$ at this time is stored at step 217 in pre-value register 142.

The flow then goes to step 204.

The above described detection operation is repeated several times.

Figure 19:
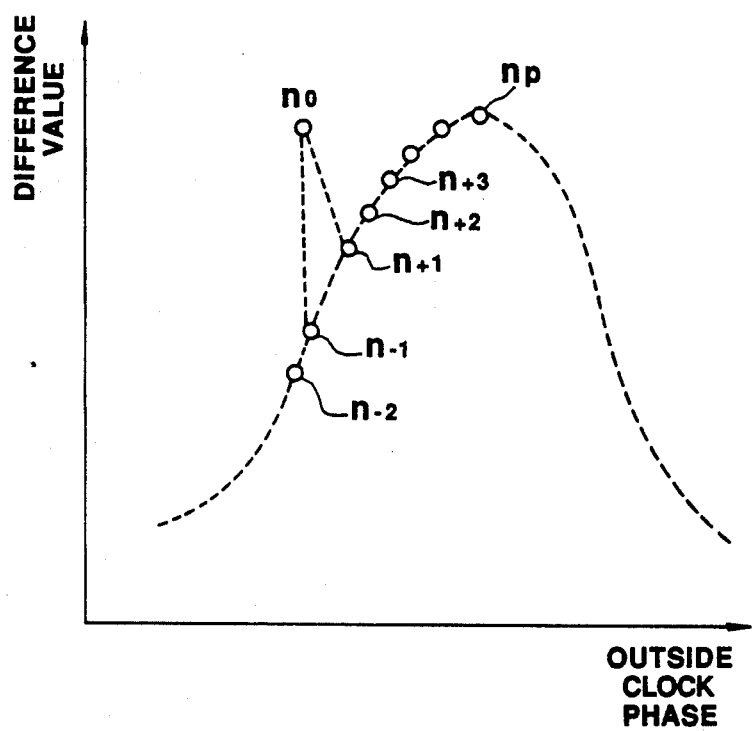
FIG. 19 is a chart for illustrating the operation of the apparatus shown is FIG. 17.

When the change of the difference of the sampling values with respect to phase changes in the outside clocks is as shown in FIG. 19, the peak of the difference should be detected at the $n_p$th phase. However, it the $n_0$th difference became larger due to noise, and the $n_{+1}$th, $n_{+2}$th and $n_{+3}$th differences are smaller than the $n_0$th difference, the $n_0$th difference would be determined to be the peak value with the previously described control system, if the number of times of protection Ma is equal to 3. With the present embodiment, the type of change is not determined to a monotonic decrease when the $n_{+1}$th difference is obtained, so that the $n_0$th difference is not erroneously detected to be the peak value.

Figure 20:
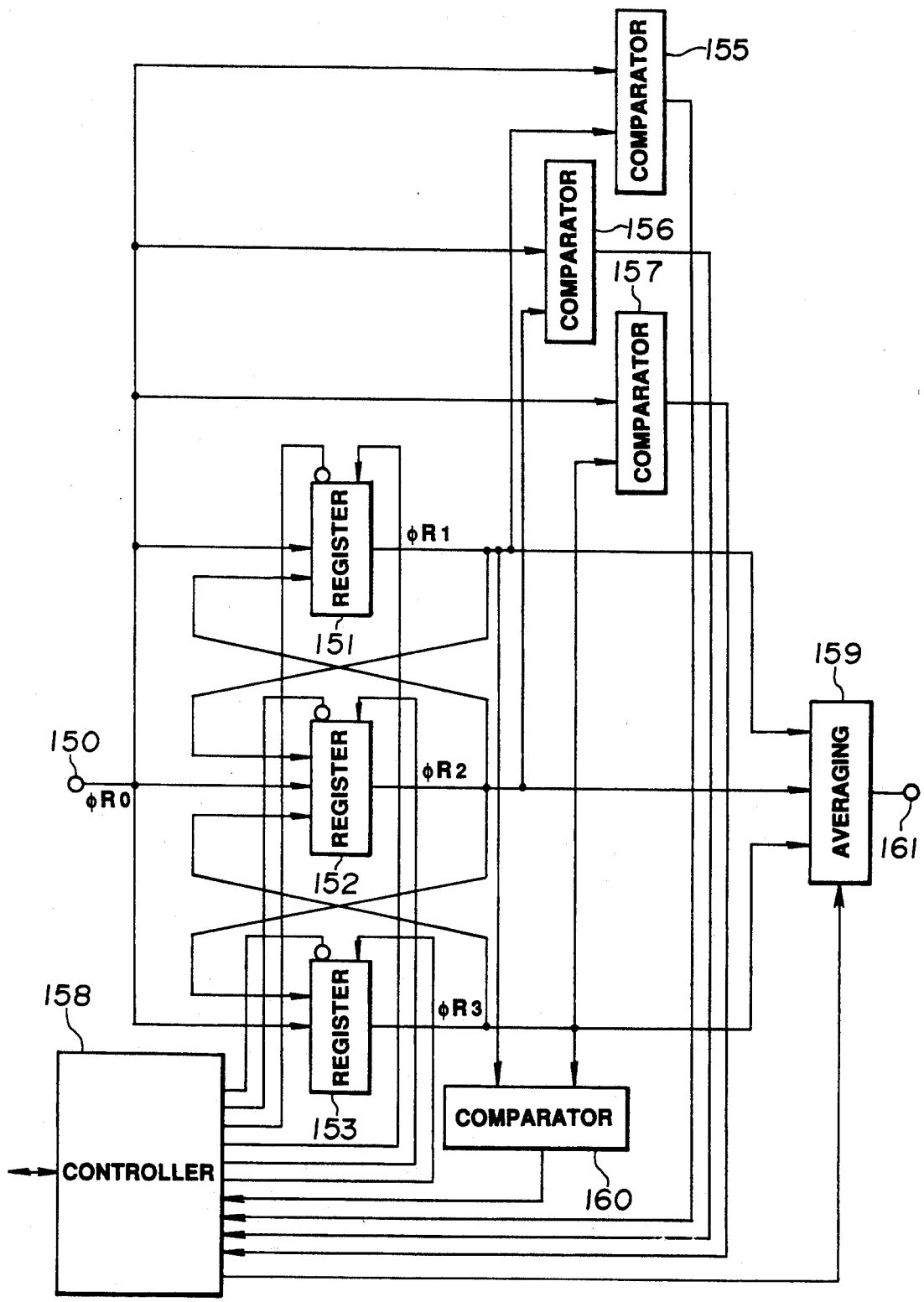
FIG. 20 is a block circuit diagram showing an example of an optimum phase detection circuit employed in an apparatus for generating data-reproducing clock signals according to the present invention.

FIG. 20 shows an example of an optimum phase detection circuit for determining the optimum outside clock phase by using the peak detection phase value obtained by several detection operations.

In FIG. 20, the peak detection phase value obtained after several detection operations is supplied to an input terminal 150. This peak detection phase value is outputted from output terminal 84 in FIG. 13 or from output terminal 145 in FIG. 17. The peak detection phase value from input terminal 150 is supplied to registers 151, 152 and 153 and to input terminals of comparators 155, 156 and 157.

The input/output to or from registers 151 to 153 is controlled by a controller 158. The registers 151 to 153 store the largest value, the next largest value and the smallest value, respectively, of the peak detection phase. The value of register 151 may be transferred to register 152, while that of register 152 may be transferred to register 153. The value of register 153 may be transferred to register 152, while the value of register 152 may be transferred to register 151.

The output of register 151 is supplied to the other input terminal of comparator 155 and to an averaging circuit 159. The output peak detection phase value is compared in comparator 155 to the value in register 151. The output of register 152 is supplied to the other input terminal of comparator 156 and to averaging circuit 159. The input peak detection phase value is compared in comparator 156 to the value in register 152. The output from register 153 is supplied to the other input terminal of comparator 157 and to averaging circuit 159. The input peak detection phase value is compared in comparator 157 to the value in register 153. The outputs of registers 151 and 153 are supplied to a comparator 160. It is checked in comparator 160 if the values in registers 151 and 153 are lower than predetermined values.

The outputs from comparators 155, 156 and 157 are supplied to controller 158, while the output of comparator 160 is also supplied to controller 158.

The state of averaging circuit 159 is controlled by an output from controller 158. The outputs of registers 151 to 153 are averaged in averaging circuit 159 to find an optimum phase. The output from averaging circuit 159 is led out at an output terminal 161.

Figure 21:
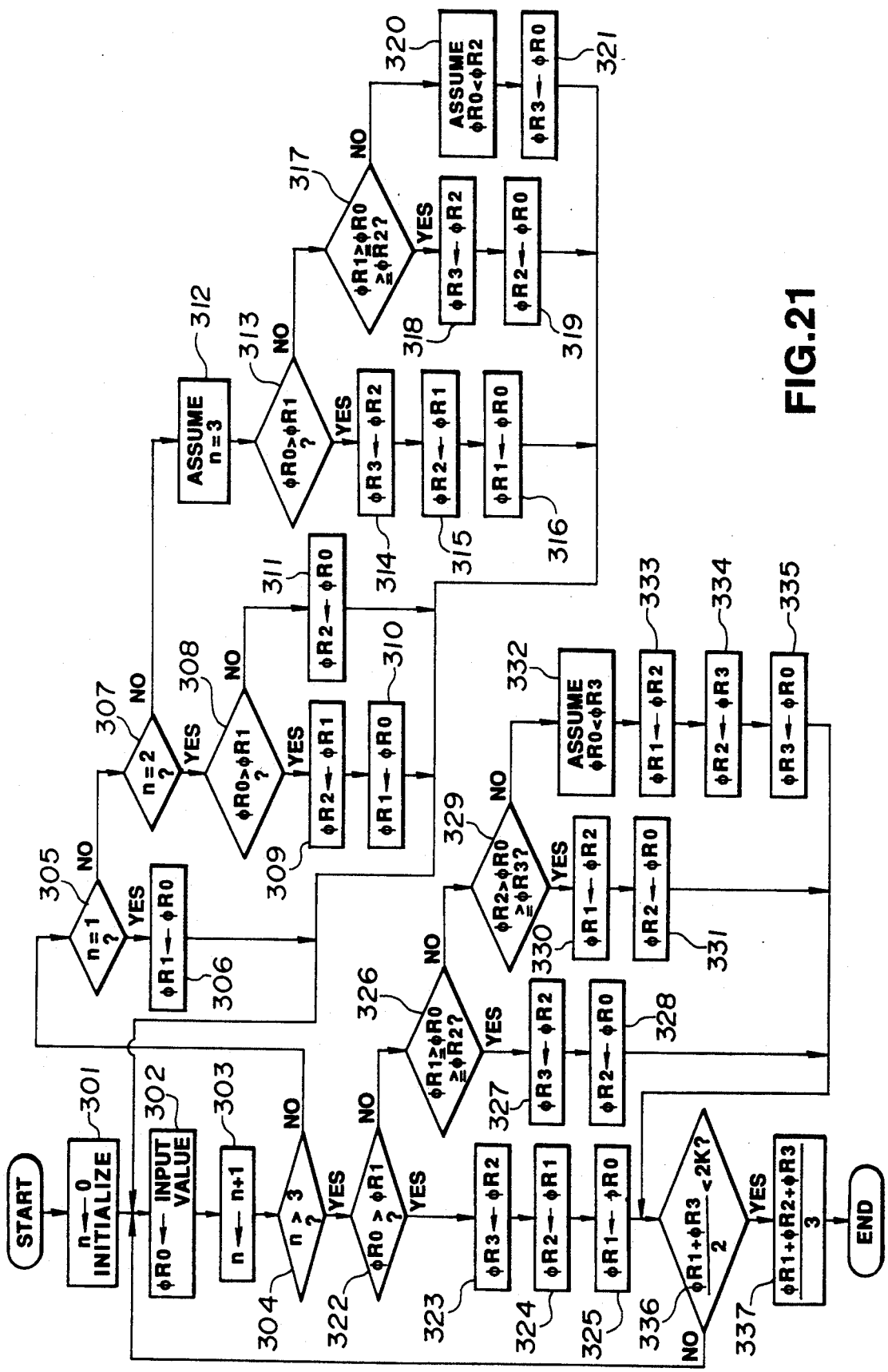
FIG. 21 is a flow chart illustrating the operation of the optimum phase detection circuit shown in FIG. 20.

FIG. 21 is a flow chart for the above described optimum phase detection circuit, wherein the variables are defined in the following manner:

$\phi R_0$ is a peak detection phase value from input terminal 150;

$\phi R_1$ is a value of register 151 indicating the largest value;

$\phi R_2$ is a value of register 151 indicating the next largest value;

$\phi R_3$ is a value of register 153 indicating the smallest value; and n is a number of data fetches.

The number of data fetches n is first initialized to "0" at step 301.

The peak detection phase value $\phi R_0$ is obtained from input terminal 150 at step 302.

The number of data fetches n is incremented at step 303.

It is checked at step 304 if the number n is not more than "3".

If the number n is not more than "3", it is checked at step 305 if the number n is "1".

If the number n is "1", the input peak detection phase value $\phi R_0$ is set at step 306 as the value $\phi R_1$ for register 151. The flow then goes to step 302.

If the number n is not "1", it is checked at step 307 if the number n is "2".

If the number n is "2", the input peak detection phase value $\phi R_1$ is compared at step 308 to the value $\phi R_1$ in register 151.

If the input peak detection phase value $\phi R_0$ is found at step 308 to be larger than the value $\phi R_1$ in register 151, the value $\phi R_1$ in register 151 is set at step 309 as the value $\phi R_2$ in register 152, while the input peak detection phase value $\phi R_0$ is set at step 310 as the value $\phi R_1$ in register 152, then the flow goes to step 302.

If the input peak detection phase value $\phi R_0$ is found at step 308 to be smaller than the value $\phi R_1$ in register 151, the input peak detection phase value $\phi R_0$ is set at step 311 as the value $\phi R_2$ in register 152, then the flow goes to step 302.

If the number n is not "2" at step 307, the number n is determined to be "3" at step 312. If the number n is "3", the input peak detection phase value $\phi R_0$ is compared at step 313 to the value $\phi R_2$ in register 151.

If the input peak detection phase value $\phi R_0$ is larger than the value $\phi R_1$ in register 151, the value $\phi$Rin register 152 is set at step 314 as the values $\phi^*R_3$ in register 153, the value $\phi R_1$ in register 151 is set at step 315 as the value $\phi R_2$ in register 152 and the input peak detection phase value $\phi R_0$ is set at step 316 as the value $\phi R_1$ in register 151, then the flow goes to step 302.

If the input peak detection phase value $\phi R_0$ is found at step 313 to be smaller than the value $\phi R_1$ in register 151, it is checked at step 317 if the input peak detection phase value $\phi R_0$ is between the value $\phi R_1$ in register 151 and the value $\phi R_2$ in register 152.

If the input peak detection phase value $\phi R_0$ is found at step 317 to be between the value $\phi R_1$ in register 151 and the value $\phi R_2$ in register 152, the value $\phi R_2$ in register 152 is set at step 318 as the value $\phi R_3$ in register 153, while the input peak detection phase value $\phi R_0$ is set at step 319 as the value $\phi R_2$ in register 152, then the flow goes to step 302.

If the input peak detection phase value $\phi R_0$ is not intermediate between the value $\phi R_1$ in register 151 and the value $\phi R_2$ in register 152, the input peak detection phase value $\phi R_0$ is determined at step 320 to be not larger than the value $\phi R_2$ in register 152, while the input peak detection phase value $\phi R_0$ is set at step 321 as the value $\phi R_3$ in register 153, then the flow goes to step 302.

After the above steps 301 to 321, the largest, the next largest and the smallest of the three input peak detection phase values fetched from the input terminal 150, are set as the values $\phi R_1$, $\phi R$, $\phi R_3$, respectively, in registers 151, 152 and 153, respectively.

If the number n is "3" or more at step 304, it is checked at step 322 if the input peak detection phase value $\phi R_0$ is larger than the value $\phi R_1$ in register 151.

If the input peak detection phase value $\phi R_0$ is larger than the value $\phi R_1$ in register 151 adapted for storing the largest peak detection phase value, the current values in registers 151 and 152 are sequentially shifted to the lower registers 152 and 153, while the input peak detection phase value is stored in register 151 adapted for storing the largest value, and the current value in register 153 adapted for storing the smallest value is eliminated. That is, if the input peak detection phase value is larger than the value $\phi R_1$ in register 151, the value $\phi_2$ in register 152 is set at step 323 as the value $\phi R_3$ in register 153, while the value $\phi R_1$ in register 151 is set at step 324 as the value $\phi R_2$ in register 152 and the input peak detection phase value $\phi R_0$ is set at step 325 as the value $\phi R_1$ in register 151. The value $\phi R_3$ which was stored in register 154 is eliminated. The flow then goes to step 336.

If the input peak detection phase value $\phi R_0$ is found at step 322 to be smaller than the value $\phi R_1$ in register 151, it is checked at step 326 if the input peak detection phase value $\phi R_0$ is between the value $\phi R_1$ in register 151 adapted for storing the largest value and the value $\phi R_2$ in register 152 adapted for storing the second largest value.

If the input peak detection phase value $\phi R_0$ is between the value $\phi R_1$ in register 151 and the value $\phi R_2$ in register 152, the value in register 152 is shifted to register 153 and the input peak detection phase value is stored in register 152, while the value which was stored in register 153 is eliminated. That is, if the input peak detection phase value $\phi R_0$ is between the value $\phi R_1$ in register 151 and the value $\phi R_2$ in register 152, the value $\phi$Rin register 152 is set at step 327 as the value $\phi R_3$ in register 153, while the input peak detection phase value $\phi R_0$ is set at step 328 as the value $\phi R_2$ in register 152. The value which was stored in register 153 is eliminated. The flow then goes to step 336.

If the input peak detection phase value $\phi R_0$ is not found at step 326 to be between the value $\phi R_1$ in register 151 and the value $\phi R_2$ in register 152 adapted for storing the next largest value and the value $\phi R_3$ in register 153 adapted for storing the smallest value.

If the input peak detection phase value $\phi R_0$ is between the value $\phi R_2$ in register 152 and the value $\phi R_3$ in register 153, the value $\phi R_2$ in register 152 is shifted to register 151 and the input peak detection phase value is stored in register 152, while the value which was stored in register 151 is eliminated. That is, if the input peak detection phase value $\phi R_0$ is between the value $\phi R_2$ in register 152 and the value $\phi R_3$ in register 153, the value $\phi R_2$ in register 152 is set at step 330 as the value $\phi R_1$ in register 151, while the input peak detection phase value $\phi R_0$ is set at step 331 as the value $\phi R_2$ in register 152. The value $\phi R_1$ which was stored in register 151 is eliminated. The flow then goes to step 336.

If the input peak detection phase value $\phi R_0$ is not found at step 329 to be between the value $\phi R_2$ in register 152 and the value $\phi R_3$ in register 153, the input peak detection phase value $\phi R_0$ is determined at step 332 to be not larger than the value $\phi R_3$ in register 153 adapted for storing the smallest value.

If the input peak detection phase value $\phi R_0$ is not larger than the value $\phi R_3$ in register 153, the Values which Were stored in registers 152 and 153 are sequentially shifted to the higher registers 151 and 152, respectively, and the input peak detection phase value is stored in register 153 adapted for storing the smallest value, while the value which was stored in register 151 adapted for storing the largest value is eliminated. That is, if the input peak detection phase value $\phi R_0$ is not larger than the value $\phi R_3$ in register 153, the value $\phi R_2$ in register 152 is set at step 333 as the value $\phi R_1$ in register 151 and the value $\phi R_3$ in register 153 is set at step 334 as the value $\phi R_2$ in register 152, while the input peak detection phase value $\phi R_0$ is set at step 335 as the value $\phi R_3$ in register 152 is eliminated. The flow then goes to step 336.

After the above steps 322 to 335, the most extreme one of the input peak detection phase values is eliminated, in such a manner that the largest, second largest and the smallest peak detection phase values are stored in registers 151, 152 and 153, respectively.

At step 336, it is checked if the difference between the value $\phi R_1$ in register 151 and the value $\phi R_3$ in register 153 is within a predetermined amount. If the difference between the value $\phi R_1$ in register 151 and the value $\phi R_3$ in register 153 is within a predetermined amount. If the difference between the value $\phi R_1$ in register 151 and the value $\phi R_3$ in register 153 is within a predetermined amount H, the flow goes to step 302. If the difference between the value $\phi R_1$ in register 151 and the value $\phi R_3$ in register 153 is not a predetermined amount an average value of the value $\phi R_1$ in register 151, the value $\phi R_2$ in register 152 and the value $\phi R_3$ in register 153 is found at step 337.

In this manner, with the above described optimum phase detection circuit, the most extreme values among the peak detection phase values obtained by several detection operations are eliminated and, when the difference between the largest and smallest values is below a predetermined value, the peak detection phase values are averaged, further reducing errors in the peak detection phase values.

Although illustrative embodiments of the present invention, and various modifications thereof, have been described in detail herein with reference to the accompanying drawings, it is to be understood that the invention is not limited to these precise embodiments and the described modifications, and that various changes and further modifications may be effected therein by one skilled in the art without departing from the scope or spirit of the invention as defined in the appended claims.

What is claimed is:

1. An apparatus for generating clock signals for reproducing data from a recording medium having thereon reference clock signals, comprising:
   outside clock signal forming means for forming a plurality of outside clock signals having respective different phases based on said reference clock signals;
   sampling means for sampling said reference clock signals in response to said outside clock signals formed by said outside clock signal forming means so as to provide respective sets of sampling values;
   maximum value detection means including processing means for calculating a difference between successive sampling values in each of said sets associated with a respective one of said outside clock signals, and detecting means for detecting a maximum value of the differences between said sampling values of said sets respectively associated with said outside clock signals; and
   outside clock signal selecting means for selecting and outputting the one of said outside clock signals formed by said outside clock signal forming means associated with said maximum value detected by said detecting means.

2. An apparatus according to claim 1; wherein said recording medium has a recording area and synchronization patterns performed on an area of said recording medium other than the recording area, and
   said outside clock signal forming means includes clock signal reproducing means for producing one of said outside clock signals by reproducing said previously formed synchronization patterns.

3. An apparatus according to claim 2; wherein said outside clock forming means includes a series of delay elements receiving said one of the outside clock signals from said clock signals from said clock signal reproducing means for representing forming the outside clock signals having respective different phases.

4. An apparatus according to claim 1; wherein said outside clock signal forming means includes:
   counting means for producing a counter output; and
   selecting means responsive to said counter output for sequentially selecting the plurality of outside clock signals having respective different phases and for supplying the sequentially selected outside clock signals to said sampling means.

5. An apparatus according to claim 1; wherein said outside clock signal forming means includes:
   shift register means for producing a shift register output; and
   selected means responsive to said shift register output for sequentially selecting the plurality of outside clock signals having respective different phases and for supplying the sequentially selected outside clock signals to said sampling means.

6. An apparatus according to claim 1; wherein said outside clock signal forming means includes:
   gray code counting means for producing a gray code counter output; and
   selector means responsive to said gray code counter output for sequentially selecting the plurality of outside clock signals having respective different phases and for supplying the sequentially selected outside clock signals to said sampling means.

7. An apparatus according to claim 1; wherein said maximum value detection means repeats the detection of said maximum values a number of times.

8. An apparatus according to claim 7; wherein each repetition of the detection of said maximum value commences with an outside clock signal having a phase approximately equal to the phase of the outside clock signal associated with a maximum value in a preceding detection thereof.

9. An apparatus according to claim 7; further comprising peak counting means for counting the number of times that a phase associated with a maximum value of differences between said sampling values is exceeded so as to supply a peak count;
   and wherein outputting of said one of said outside clock signals occurs after said peak count reaches a predetermined protection number.

10. An apparatus according to claim 7; further comprising means for determining whether differences between sampling values decrease monotonically following a maximum difference; and
    wherein an outside clock signal associated with said maximum difference is outputted only when said differences between sampling values decrease monotonically.

11. An apparatus according to claim 7; further comprising:
    optimum phase detecting means for receiving a sequence of phase values associated with the maximum values which are repetitively detected, and for computing an optimum phase value of said sequence of phase values and outputting said optimum phase value.

12. An apparatus according to claim 11; wherein said optimum phase detecting means includes means eliminating at least one of said phase values which is most extreme.

13. An apparatus according to claim 11; wherein said optimum phase detecting means includes means for averaging a plurality of said phase values of said sequence.

14. An apparatus according to claim 11; wherein said optimum phase detecting means includes means for detecting when a difference between a largest phase value of said sequence and a smallest phase value of said sequence is below a predetermined number.

15. An apparatus for reproducing data recorded at a maximum recording frequency on a recording medium also having thereon reference clock signals of a frequency equal to said maximum recording frequency, comprising:
    outside clock signal forming means for forming a plurality of outside clock signals having respective different phases;
    sampling means for sampling said reference clock signals reproduced from said recording medium in response to said outside clock signals formed by said outside clock signal forming means so as to provide respective sets of reference clock sampling values and for sampling the recorded data reproduced from said recording medium and in response to one of said outside clock signals so as to provide recorded data sampling values;

first processing means for calculating a reference clock difference between successive reference clock sampling values in each of said sets provided by said sampling means, and for calculating a recorded data difference between successive record data sampling values provided by said sampling means;

maximum value detection means for detecting a maximum value of the reference clock differences between said reference clock sampling values of said sets respectively associated with said outside clock signals;

outside clock signal selecting means for selecting and outputting the one of said outside clock signals formed by said outside clock signal forming means which is associated with said maximum value detected by said maximum value detection means; and data reproducing means including second processing means for calculating a threshold value approximately equal to one half of said maximum value detected by said maximum value detection means, and comparing means for comparing the recorded data difference calculated by said first processing means based on said recorded data sampling values sampled by said sampling means in response to said one outside clock signal selected by said outside clock signal selecting means with said threshold value, thereby reproducing said recorded data.

16. An apparatus for reproducing data recorded at a maximum data recording frequency on a recording medium also having thereon reference clock signals of a frequency equal to said maximum data recording frequency and a reference signal which is reproduced as a constant level reference signal, comprising:

outside clock signal forming means for forming a plurality of outside clock signals having respective different phases;

sampling means for sampling said reference clock signals reproduced from said recording medium in response to said outside clock signals so as to provide respective sets of reference clock sampling values, for sampling said constant level reference signal reproduced from said recording medium using one of said outside clock signals so as to produce reference level sampling values, and for sampling said recorded data reproduced from said recording medium using one of said outside clock signals so as to provide recorded data sampling values;

processing means for calculating differences between successive reference clock sampling values, reference level sampling values, and recorded data sampling values provided by said sampling means;

maximum value detection means for detecting a first maximum value of the differences between said reference clock sampling values of said sets respectively associated with said outside clock signals;

outside clock signal selecting means for selecting and outputting the one of said outside clock signals formed by said outside clock forming means which is associated with said maximum value detected by said maximum value detection means;

maximum noise detection means for detecting a second maximum value of differences between said reference level sampling values;

combining means for combining said first maximum value and said second maximum value so as to produce a threshold value; and data reproducing means for comparing a difference between said recorded data sampling values sampled by said sampling means in response to said one outside clock signal selected by said outside clock signal selecting means and said threshold value, thereby reproducing said recorded data.

17. A method for reproducing recorded data from a recording medium also having reference clock signals recorded thereon, comprising the steps of:

incrementing the phase of reproduced reference clock signals in one direction so as to provide a first sequence of phase incremented outside clock signals having respective different phases;

sampling said reproduced reference clock signals with said first sequence of phase incremented outside clock signals so as to provide respective sampling values;

finding difference values between successive sampling values associated with each of said phase incremented outside clock signals of said first sequence;

comparing a current difference value and a preceding difference value to detect a first peak value of said difference values;

outputting the one of said first sequence of phase incremented outside clock signals associated with said first peak value while inverting the direction of phase incrementing;

incrementing the phase of reproduced reference clock signals so as to provide a subsequent sequence of phase incremented outside clock signals having respective different phases;

detecting a subsequent peak value of difference values by comparing a difference of sampling values from sampling said reproduced reference clock signals in response to said subsequent sequence of phase incremented outside clock signals with a peak value of preceding differences;

repetitively outputting the one of said outside clock signals associated with said subsequent peak value, while inverting the direction of phase incrementing; and reproducing said recorded data by using the outputted outside clock signals for sampling said recorded data.

* * * * *